(12) United States Patent
Ito et al.

(10) Patent No.: US 11,221,462 B2
(45) Date of Patent: *Jan. 11, 2022

(54) LENS UNIT, IMAGING DEVICE, AND CONTROL METHOD

(71) Applicant: SONY CORPORATION, Tokyo (JP)

(72) Inventors: Tomoomi Ito, Kanagawa (JP); Rui Chen, Tokyo (JP); Makoto Kanai, Tokyo (JP); Fumikazu Kanetaka, Chiba (JP); Naoki Miyagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,524

(22) Filed: Jan. 21, 2020

(65) Prior Publication Data

US 2020/0162651 A1 May 21, 2020

Related U.S. Application Data

(63) Continuation of application No. 15/700,980, filed on Sep. 11, 2017, now Pat. No. 10,567,631, which is a
(Continued)

(30) Foreign Application Priority Data

Feb. 2, 2016 (JP) .................................. 2016-017925

(51) Int. Cl.
*H04N 5/225* (2006.01)
*G02B 7/36* (2021.01)
(Continued)

(52) U.S. Cl.
CPC .................. *G02B 7/36* (2013.01); *G02B 7/08* (2013.01); *G02B 7/28* (2013.01)

(58) Field of Classification Search
CPC ... G02B 7/36; G02B 7/08; G02B 7/28; H04N 5/232
(Continued)

(56) References Cited

U.S. PATENT DOCUMENTS 4,474,449 A 10/1984 Kusuaka
4,482,234 A 11/1984 Takagi et al.
(Continued)

FOREIGN PATENT DOCUMENTS

| CN | 101101429 A | 1/2008 |
| CN | 103513395 A | 1/2014 |

(Continued)

OTHER PUBLICATIONS

Japanese Office Action dated May 24, 2016, in Japanese Patent Application No. 2016-017925.
(Continued)

*Primary Examiner* — Stephen P Coleman
(74) *Attorney, Agent, or Firm* — Oblon, McClelland, Maier & Neustadt, L.L.P.

(57) ABSTRACT

There is provided a lens unit equipped with multiple focus lenses provided inside a lens barrel, multiple actuators corresponding to the respective multiple focus lenses and configured to move each of the multiple focus lenses inside the lens barrel, and a control circuit configured to control movement of the multiple focus lenses according to different rules between a case of a position of each of the multiple focus lenses being inside a designated range of satisfactory optical performance, and a case of being outside the range.

31 Claims, 9 Drawing Sheets

Related U.S. Application Data continuation of application No. 15/099,226, filed on Apr. 14, 2016, now Pat. No. 9,813,603.

(51) Int. Cl.
  *G02B 7/28* (2021.01)
  *G02B 7/08* (2021.01)

(58) Field of Classification Search
  USPC .......................................................... 348/360
  See application file for complete search history.

(56) References Cited

U.S. PATENT DOCUMENTS

| | | | |
|---|---|---|---|
| 10,567,631 B2* | 2/2020 | Ito | H04N 5/232 |
| 2004/0257461 A1 | 12/2004 | Toyomura | |
| 2009/0116830 A1 | 5/2009 | Kumagai | |
| 2009/0142046 A1* | 6/2009 | Lin | H04N 5/35721 396/95 |
| 2012/0262595 A1 | 10/2012 | Kishida | |
| 2013/0010373 A1 | 1/2013 | Abe | |
| 2014/0168383 A1 | 6/2014 | Murakami | |
| 2014/0184887 A1 | 7/2014 | Yonetani | |
| 2014/0300792 A1 | 10/2014 | Nakamura | |
| 2015/0237254 A1 | 8/2015 | Chino | |

FOREIGN PATENT DOCUMENTS

| | | |
|---|---|---|
| JP | 59-022013 | 2/1984 |
| JP | 59-64816 A | 4/1984 |
| JP | 63-198026 A | 8/1988 |
| JP | 02-037314 | 2/1990 |
| JP | 4-258087 | 9/1992 |
| JP | 6-251449 | 9/1994 |
| JP | 2000-155256 | 6/2000 |
| JP | 2000-305001 | 11/2000 |
| JP | 2001-235239 | 8/2001 |
| JP | 2004-252366 | 9/2004 |
| JP | 2008-20710 A | 1/2008 |
| JP | 2009-8984 A | 1/2009 |
| JP | 2010-092035 | 4/2010 |
| JP | 2010-107714 | 5/2010 |
| JP | 4685907 | 5/2011 |
| JP | 2011-123339 | 6/2011 |
| JP | 2011-242791 | 12/2011 |
| JP | 2012-118491 A | 6/2012 |
| JP | 2015-040940 | 3/2015 |
| JP | 2015-154565 | 8/2015 |

OTHER PUBLICATIONS

Extended European Search Report dated Jul. 11, 2017, in European Patent Application No. 16179371.6.
Japanese Office Action dated Dec. 5, 2017 in Japanese Patent Application No. 2016-204857.

* cited by examiner

LENS UNIT, IMAGING DEVICE, AND CONTROL METHOD

CROSS REFERENCE TO RELATED APPLICATIONS

This application is a continuation application of U.S. application Ser. No. 15/700,980 filed Sep. 11, 2017, which is a continuation application of U.S. application Ser. No. 15/099,226 filed Apr. 14, 2016, which claims the benefit of Japanese Priority Patent Application JP 2016-017925 filed Feb. 2, 2016, the entire contents of each are incorporated herein by reference.

BACKGROUND

The present disclosure relates to a lens unit, an imaging device, and a control method.

Technologies related to a lens unit equipped with multiple lenses for realizing a function of adjusting focus are being developed. One technology related to a lens unit equipped with multiple lenses is described in JP 2014-44223A, for example.

SUMMARY

Contrast autofocus (hereinafter also designated "contrast AF") is one method of adjusting focus automatically. When contrast autofocus is used, the in-focus point is detected on the basis of an approximate curve obtained from acquired contrast values, and thus contrast values on either side of the in-focus point need to be acquired. Also, each contrast value is acquired by moving each of multiple focus lenses constituting a lens unit.

However, because of factors such as physical limitations on focus lens movement due to the configuration of the lens unit, for example, a situation may occur in which a focus lens is not sufficiently moved over a desirable range for acquiring contrast values for conducting contrast AF. As above, if a focus lens is not sufficiently moved over a desirable range for acquiring contrast values, or in other words, if an insufficiency of movement is produced in a focus lens, there is a risk of being unable to conduct contrast AF with sufficient accuracy.

The present disclosure proposes a new and improved lens unit, imaging device, and control method enabling a resolution of an insufficiency of focus lens movement which may be produced when conducting contrast autofocus.

According to an embodiment of the present disclosure, there is provided a lens unit equipped with multiple focus lenses provided inside a lens barrel, multiple actuators corresponding to the respective multiple focus lenses and configured to move each of the multiple focus lenses inside the lens barrel, and a control circuit configured to control movement of the multiple focus lenses according to different rules between a case of a position of each of the multiple focus lenses being inside a designated range of satisfactory optical performance, and a case of being outside the range.

Additionally, according to an embodiment of the present disclosure, there is provided an imaging device equipped with a lens unit and an imaging unit. The lens unit includes multiple focus lenses provided inside a lens barrel, multiple actuators corresponding to the respective multiple focus lenses and configured to move each of the multiple focus lenses inside the lens barrel, and a control circuit configured to control movement of the multiple focus lenses according to different rules between a case of a position of each of the multiple focus lenses being inside a designated range of satisfactory optical performance, and a case of being outside the range.

Additionally, according to an embodiment of the present disclosure, there is provided a control method executed by a control circuit of a lens unit. The control method includes controlling movement of multiple focus lenses provided inside a lens barrel according to different rules between a case of a position of each of the multiple focus lenses being inside a designated range of satisfactory optical performance, and a case of being outside the range.

According to an embodiment of the present disclosure, it is possible to resolve an insufficiency of focus lens movement which may be produced when conducting contrast autofocus.

Note that the effects described above are not necessarily limited, and along with or instead of the effects, any effect that is desired to be introduced in the present specification or other effects that can be expected from the present specification may be exhibited.

DETAILED DESCRIPTION OF THE EMBODIMENT(S)

Figure 1:
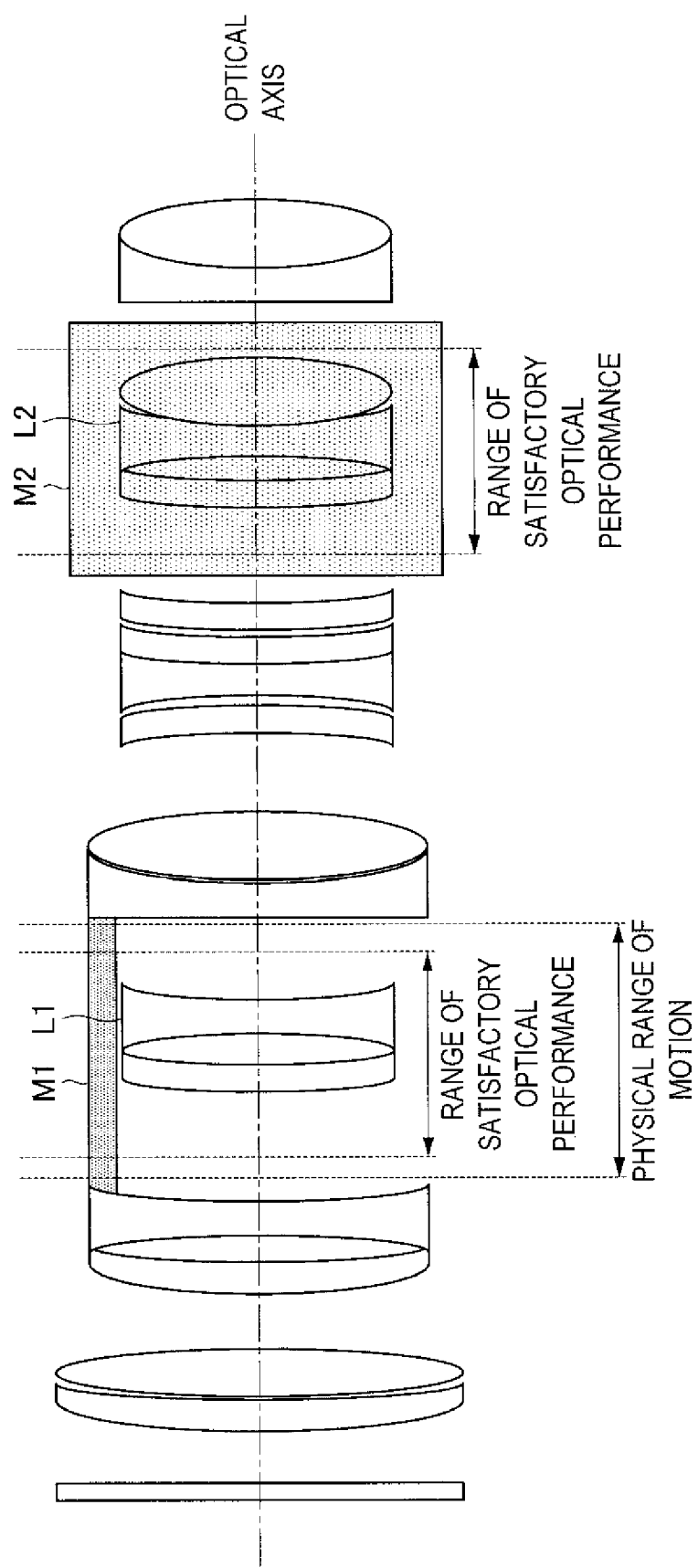
FIG. 1 is an explanatory diagram illustrating an example of a configuration of a lens unit according to an embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description hereinafter will proceed in the following order.

1. Control method according to embodiment
2. Lens unit and imaging device according to embodiment
3. Program according to embodiment (Control Method According to Embodiment)

First, a control method according to an embodiment will be described. Hereinafter, an example will be given in which a lens unit according to the present embodiment conducts a process in accordance with a control method according to the present embodiment.

In addition, the following primarily describes an example for a single focus point, or in other words, a case in which the focal length is fixed, and the object distance (typically the distance between the imaging device and the in-focus image plane; also called the "subject distance") moves with respect to this focal length. However, the control method according to the present embodiment is not limited to being applied to a single focus point. For example, the control method according to the present embodiment may also be applied to the case of a variable focal length.

FIG. 1 is an explanatory diagram illustrating an example of a configuration of a lens unit according to the present embodiment. FIG. 1 is a simplified illustration of the lenses provided in a lens barrel (not illustrated) and various mechanisms such as an actuator and a cam ring. The lenses provided in the lens barrel (not illustrated) include various lenses, such as a focus lens, a zoom lens, and a fixed focal length lens, for example.

Note that in the lens unit according to the present embodiment, the focus lens may be the same lens as other lenses, such as the zoom lens. For example, the case of the focus lens and the fixed focal length lens being the same lens corresponds to an example of the case of a single focus point. As another example, the case of the focus lens and the zoom lens being the same lens corresponds to an example of the case of a variable focal length. As discussed above, the following describes a control method according to the present embodiment while presupposing a single focus point. Also, in the case of a variable focal length, the "range of satisfactory optical performance" discussed later changes for multiple focus lenses.

The sign L1 illustrated in FIG. 1 represents one focus lens, while the sign M1 illustrated in FIG. 1 represents an actuator that moves the focus lens L1 inside the lens barrel. Also, the sign L2 in FIG. 1 represents another focus lens, while the sign M2 illustrated in FIG. 1 represents a cam ring. Also, although not illustrated in FIG. 1, the lens unit according to the present embodiment is equipped with an actuator that moves the focus lens L2 inside the lens barrel.

The focus lens L1 and the focus lens L2 are made up of one focus lens each. Also, one or both of the focus lens L1 and the focus lens L2 may be a lens group made up of multiple sub-lenses. In addition, the focus lens L1 and the focus lens L2 may move inside the lens barrel according to the corresponding actuator of each. To take FIG. 1 as an example, each of the focus lens L1 and the focus lens L2 may move inside the lens barrel in the left and right direction of FIG. 1 along the optical axis.

Note that the number of focus lenses provided in the lens unit according to the present embodiment is not limited to two like the focus lens L1 and the focus lens L2 illustrated in FIG. 1. For example, the lens unit according to the present embodiment may also be provided with three or more focus lenses. The lens unit according to the present embodiment may take a configuration in which at least one of the multiple focus lenses is a lens group made up of multiple sub-lenses. Hereinafter, for the sake of convenience, an example will be described in which the lens unit according to the present embodiment is provided with two focus lenses designated the focus lens L1 and the focus lens L2.

As discussed above, when contrast AF is conducted, for example, an insufficiency of movement may be produced in a focus lens due to factors such as physical limitations on focus lens movement due to the configuration of the lens unit. Hereinafter, this insufficiency of movement in a focus lens may also be referred to simply as an "insufficiency".

Figure 2:
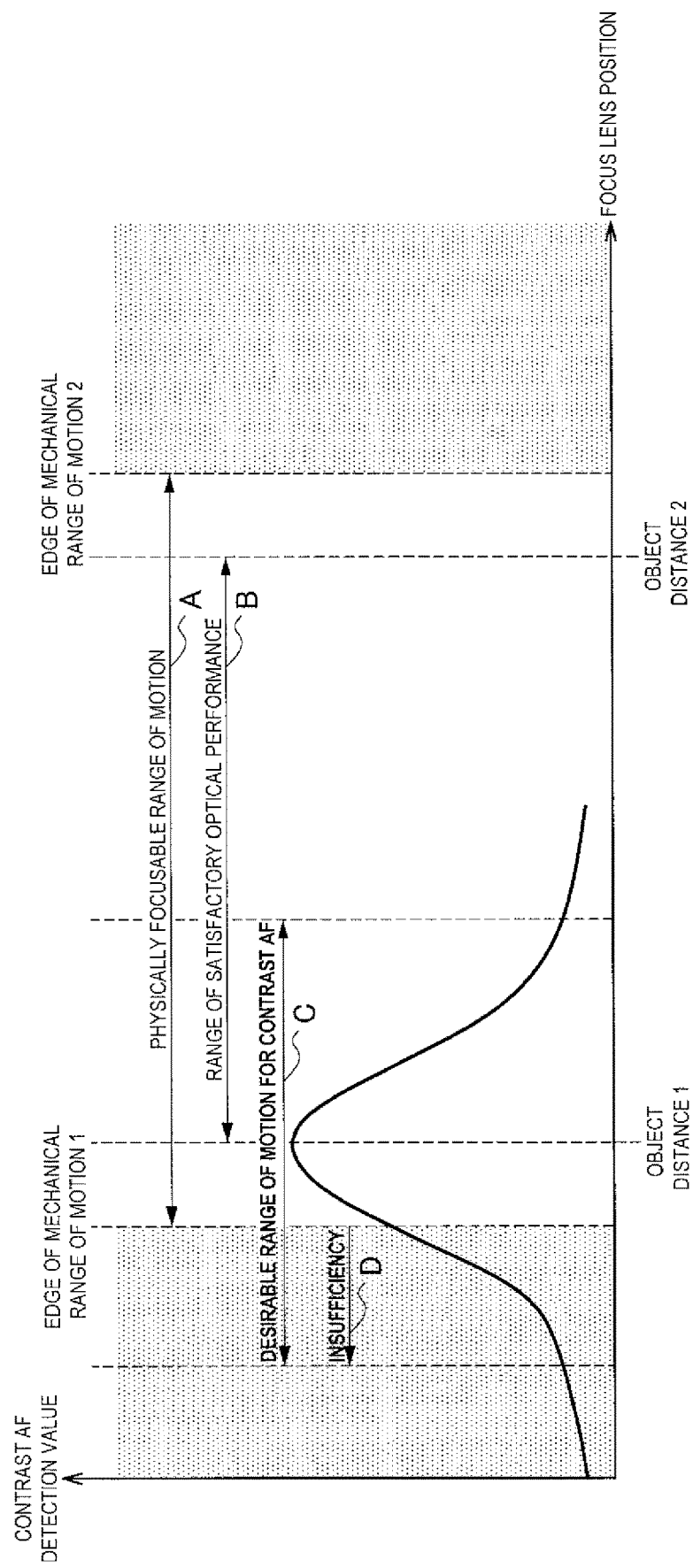
FIG. 2 is an explanatory diagram for illustrating a control method according to an embodiment.

FIG. 2 is an explanatory diagram for illustrating a control method according to the present embodiment, and illustrates an example of an insufficiency of focus lens movement that may be produced when contrast AF is conducted. FIG. 2 illustrates a relationship between positions of a certain focus lens and contrast AF detection values (this corresponds to the contrast values discussed earlier).

As illustrated in FIG. 2, for a certain focus lens, there exists a "physically focusable range of motion" labeled A in FIG. 2, caused by factors such as physical limitations due to the configuration.

In addition, for a certain focus lens, a "range of satisfactory optical performance" labeled B in FIG. 2 is set inside the "physically focusable range of motion". Herein, "satisfactory optical performance" according to the present embodiment refers to satisfying a preset modulation transfer function (MTF) with respect to another focus lens that cooperates with the relevant focus lens, for example. The infinity side of the "range of satisfactory optical performance" is called "INF", while the minimum object distance side of the "range of satisfactory optical performance" is called "MOD" (minimum object (optical) distance). Hereinafter, the object distance corresponding to "INF" is designated the "object distance 1", and the object distance corresponding to "MOD" is designated the "object distance 2".

If the position of the focus lens exists inside the "range of satisfactory optical performance" labeled B in FIG. 2, this means that the relevant focus lens and other cooperating focus lenses may be utilized to capture an image with satisfactory optical performance. If the object distance based on multiple focus lenses is included between the object distance 1 and the object distance 2, a preset MTF will be satisfied in each image plane from the object distance 1 to the object distance 2. Also, if the preset MTF 15 satisfied, the focus lens group constituting the multiple focus lenses exists inside the "range of satisfactory optical performance" labeled B in FIG. 2.

In addition, when contrast AF is conducted, there exists a desirable range for acquiring contrast values for conducting contrast AF, like the "desirable range of motion for contrast AF" labeled C in FIG. 2.

For example, as illustrated in FIG. 2, when the peak position of the approximate curve obtained from the contrast values, or in other words, the in-focus point for contrast AF, exists near the object distance 1, a situation may occur in which the "desirable range of motion for contrast AF" labeled C in FIG. 2 is not included in the "physically focusable range of motion" labeled A in FIG. 2. One example of a case in which the in-focus point exists near the object distance 1 is the case in which contrast AF is conducted on a subject present near the object distance 1, for example.

Furthermore, the range of the "desirable range of motion for contrast AF" labeled C in FIG. 2 that is not included in the "physically focusable range of motion" labeled A in FIG. 2 corresponds to the "insufficiency" labeled D in FIG. 2.

When contrast AF is conducted, if an "insufficiency" like the one labeled D in FIG. 2 is produced, contrast values are not obtained adequately, and there is a risk of being unable to conduct contrast AF with adequate accuracy.

Accordingly, the lens unit according to the present embodiment conducts a "process of controlling the movement of multiple focus lenses" (hereinafter designated the "movement control process") as a process according to a control method according to the present embodiment.

In the lens unit according to the present embodiment, the movement control process according to the present embodiment is conducted by a control circuit provided in the lens unit according to the present embodiment, for example.

The control circuit controls the movement of multiple focus lenses by controlling the operation of the multiple actuators corresponding to the respective multiple focus lenses. The control circuit controls the operation of the actuators by transmitting, to an actuator to be controlled, a control signal that controls the operation of the actuator, for example.

Herein, each actuator according to the present embodiment causes a corresponding focus lens to move inside the lens barrel, as described with reference to FIG. 1. Thus, by controlling the operation of an actuator, the control circuit is able to cause the focus lens corresponding to that actuator to move inside the lens barrel according to the control of the operation of the actuator. An example of the control circuit that conducts the movement control process will be discussed later.

More specifically, the lens unit according to the present embodiment controls the movement of the multiple focus lenses by changing the rules regarding the movement of the multiple focus lenses between a "case in which the position of each of the multiple focus lenses is inside a designated range of satisfactory optical performance", and a "case in which the position of each of the multiple focus lenses is outside the designated range of satisfactory optical performance". In other words, the lens unit according to the present embodiment controls the movement of the multiple focus lenses according to different rules depending on whether the position of each of the multiple lenses is in-range or out-of-range.

Herein, "in-range" according to the present embodiment refers to the range of positions of the focus lenses that enables imaging with satisfactory optical performance using the focus lenses. Also, "out-of-range" according to the present embodiment refers to the range of positions of the focus lenses that does not enable imaging with satisfactory optical performance using the focus lenses. When the position of each of the multiple focus lenses is in-range, the object distance based on the multiple focus lenses becomes positioned between the minimum object distance (the object distance 1 illustrated in FIG. 2) and infinity (the object distance 2 illustrated in FIG. 2), like the "range of satisfactory optical performance" labeled B in FIG. 2. For example, in some cases the optical performance may be unsatisfactory due to physical limitations on the focus lens inter-group distance (discussed later).

In other words, one example of a case in which the positions of the focus lenses are in-range is the case in which the positions of the focus lenses are inside the "range of satisfactory optical performance" labeled B in FIG. 2. Also, one example of a case in which the positions of the focus lenses are out-of-range is the case in which the positions of the focus lenses are inside the "physically focusable range of motion" labeled A in FIG. 2, but not inside the "range of satisfactory optical performance" labeled B in FIG. 2. As discussed above, the "range of satisfactory optical performance" is obtained based on whether or not a preset MTF is satisfied, for example.

Rules regarding the movement of the multiple focus lenses according to the present embodiment are prescribed by a movement profile, for example.

Herein, a movement profile according to the present embodiment is settings information related to control of the movement of the focus lenses. Examples of movement profiles according to the present embodiment include, for example, data indicating a relational expression of satisfactory optical performance expressing a relationship between the amount of blur and the amount of movement, or a table (or a database; this applies similarly hereinafter) associating the amount of blur with the amount of movement of each focus lens obtained from the above relational expression of satisfactory optical performance.

In a case that the lens unit is a zoom lens unit which has the zoom lens, the lens unit can have a plurality of the movement profiles corresponding to each of focal lengths.

The lens unit according to the present embodiment controls the movement of the multiple focus lenses when in-range and the movement of the multiple focus lenses when out-of-range on the basis of different movement profiles, for example. In other words, the lens unit according to the present embodiment switches the movement profile to use for control between the case in which the position of each of the multiple focus lenses is in-range, and the case in which the position of each of the multiple focus lenses is out-of-range, for example. Herein, switching the movement profile to use for control corresponds to switching the rules regarding the movement of the multiple focus lenses.

By controlling the movement of the multiple focus lens on the basis of different movement profiles between the case in which the position of each of the multiple focus lenses is in-range and the case in which the position of each of the multiple focus lenses is out-of-range, the rules regarding the movement of the multiple focus lenses change between the case of being in-range and the case of being out-of-range.

In addition, the lens unit according to the present embodiment conducts the movement control process on the basis of control information. The control information that the lens unit according to the present embodiment uses in the movement control process is acquired from an imaging unit according to the present embodiment, for example.

The control information according to the present embodiment is data indicating the amount of blur per unit time, for example. The control information is generated by the imaging unit according to the present embodiment, for example. In the imaging unit according to the present embodiment, the amount of blur per unit time is determined on the basis of the detection result of a signal obtained by imaging through the lens unit according to the present embodiment.

Herein, the unit time according to the present embodiment may be a fixed amount of time, such as 1 [sec] or 2 [sec], for example, or a variable amount of time that may be set based on a user operation or the like. Hereinafter, a case in which the unit time according to the present embodiment is 1 [sec] will be described as an example.

Also, the amount of blur according to the present embodiment is a value indicating the degree of defocusing after the unit time at an arbitrary position of interest in-range, for example. The amount of blur according to the present embodiment may also be called the "amount of defocus", for example.

In addition, "defocusing" according to the present embodiment refers to "changing the spatial frequency (lowering the spatial frequency)" or "changing the deviation from the imaging plane (increasing the deviation)" by changing the focal depth (image plane).

Note that the control information according to the present embodiment is not limited to the above data indicating the amount of blur per unit time. For example, the control information according to the present embodiment may also be one or both of data indicating the amount of movement of the multiple focus lenses, and data indicating the movement speed of the multiple focus lenses. In addition, the control information according to the present embodiment may also be data indicating the position of a focus lens, for example. At this point, examples of data indicating position in the case in which the lens unit according to the present embodiment includes multiple focus lenses include, for example, data indicating the position of each of the multiple focus lenses, or data indicating a virtual position when treating the multiple focus lenses as a single focus lens. Hereinafter, a case in which the control information according to the present embodiment is data indicating the amount of blur per unit time will be described as an example.

The imaging unit according to the present embodiment determines the amount of blur per unit time based on data indicating the contrast obtained from a signal obtained by components such as an image sensor, a filter, and a detection circuit, for example (for example, data indicating contrast AF detection values; this is one example of a detection result of a signal obtained by imaging).

Herein, the lens unit according to the present embodiment and the imaging unit according to the present embodiment may be units constituting a single device, or separate units. If the imaging unit according to the present embodiment and the lens unit according to the present embodiment are separate units, the imaging unit according to the present embodiment functions as an imaging device (also referred to as the camera body), while the lens unit according to the present embodiment functions as an interchangeable lens. An example of the configuration in the case of the lens unit according to the present embodiment and the imaging unit according to the present embodiment being units constituting a single device, and an example of the configuration in the case of the lens units according to the present embodiment and the imaging unit according to the present embodiment being separate units, will be discussed later.

Note that if the control information is acquired from an external device such as the imaging unit according to the present embodiment, the external device transmits control information specifying the amount of blur per unit time, for example. However, the lens unit according to the present embodiment may not be dependent on an external device to transmit control information in some cases, depending on how the amount of blur per unit time is realized. In other words, the lens unit according to the present embodiment may also conduct the movement control process on the basis of acquired control information, without depending on an external device to transmit control information. One example of a movement control process based on acquired control information in the lens unit according to the present embodiment is, for example, a process of controlling the movement of multiple focus lenses on the basis of control information, with different rules regarding the movement of the multiple focus lenses for the in-range case and out-of-range case, so that the movement of the multiple focus lenses in the in-range case and the out-of-range case is considered equal with respect to the amount of blur per unit time indicated by the control information.

Thus, even assuming that an external device that transmits control information, such as the imaging unit according to the present embodiment, evolves to become more multi-functional and advanced, the lens unit according to the present embodiment is able to conduct the movement control process without depending on such an external device. Consequently, when the lens unit according to the present embodiment is used, even assuming that an external device that transmits control information, such as the imaging unit according to the present embodiment, evolves to become more multi-functional and advanced, compatibility with such an external device may be ensured.

The lens unit according to the present embodiment controls the movement of the multiple focus lenses so that the amount of blur indicated by the control information is satisfied in the case in which the position of each focus lens is in-range, and the case in which the position of each focus lens is out-of-range.

The lens unit according to the present embodiment determines the amount of movement by which to move each focus lens on the basis of the amount of blur indicated by the control information. Subsequently, the lens unit according to the present embodiment controls the movement of the multiple focus lenses by moving the multiple focus lenses by the determined amount of movement.

Herein, the lens unit according to the present embodiment determines a movement speed per unit time for each of the multiple focus lenses, on the basis of the amount of blur indicated by the control information, for example. By determining a movement speed per unit time, an amount of movement per unit time by which to move each focus lens may be obtained. Note that the lens unit according to the present embodiment may also determine the amount of movement per unit time without determining the movement speed per unit time.

As discussed above, in the lens unit according to the present embodiment, the movement control process is conducted by the control circuit. In addition, the control circuit moves a focus lens by transmitting a control signal to an actuator to be controlled and controlling the operation of that actuator. The control circuit controls the movement of each of the multiple focus lenses by transmitting to each actuator a control signal including a command causing a focus lens to be moved by a determined amount of movement. In other words, the amount of movement determined in the control circuit corresponds to a driving amount by which to cause an actuator to operate.

In the lens unit according to the present embodiment, the control circuit controls the operation of the actuators on the basis of the control information as above, and thus the amount of blur is controlled.

The lens unit according to the present embodiment controls the movement of the multiple focus lenses so that the amount of blur indicated by the control information is satisfied in each of the in-range case and the out-of-range case, as indicated in (1) and (2) below, for example. In other words, the lens unit according to the present embodiment controls the movement of the multiple focus lenses according to a method of control that depends on the object distance, for example. Herein, the controls indicated in (1) and (2) below correspond to an example of controls based on different movement profiles, for example.

(1) Case in Which Position of Each of Multiple Focus Lenses is In-Range

The lens unit according to the present embodiment computes the amount of movement for each of the multiple focus lenses by using a relational expression of satisfactory optical performance expressing a relationship between the amount of blur and the amount of movement, for example. The relationship between the amount of blur and the amount of movement may be said to be a "relationship between the amount of movement of each of the multiple focus lenses and the amount of movement of the image plane", or a "relationship between the amount of blur at an arbitrary point of interest in-range and the amount of movement of the image plane (or the amount of movement of each of the multiple focus lenses realizing the amount of movement of the image plane)", for example.

Herein, the relational expression of satisfactory optical performance may be, for example, an expression prescribing position relationships among the multiple focus lenses so that even if the focal length (focal depth, image plane) is changed, the amount of blur at the changed focal length (spatial frequency or MTF) satisfies a preset value. Especially in the case of the zoom lens unit, a plurality of the relational expressions corresponding to the plurality of focal length can be applied.

In addition, the lens unit according to the present embodiment may also compute the amount of movement of each of the multiple focus lenses by referencing, for example, a table (or a database; this applies similarly hereinafter) associating the amount of blur with the amount of movement of each focus lens obtained from the above relational expression of satisfactory optical performance. Herein, the table associating the amount of blur with the amount of movement is stored in a recording medium, such as a recording medium provided in the lens unit according to the present embodiment, or a recording medium external to the lens unit according to the present embodiment, for example.

(2) Case in Which Position of each of Multiple Focus Lenses is Out-of-Range

When the position of each of the multiple focus lenses is out-of-range, imaging with satisfactory optical performance is not required. In other words, when the position of each of the multiple focus lenses is out-of-range, it is sufficient to control only the amount of blur.

Thus, the lens unit according to the present embodiment computes the amount of movement of each of the multiple focus lenses so as to satisfy the amount of blur indicated by the control information, and also so that the proportion of the amount of blur for each focus lens is different from the case of (1) above, for example.

Taking the case of computing the amount of movement of the focus lens L1 and the focus lens L2 illustrated in FIG. 1 as an example, the lens unit according to the present embodiment computes the amount of movement of the focus lens L1 and the focus lens L2 according to Expression 1 below, for example. Note that if there are three or more focus lenses, a number of terms equal to the number of focus lenses is added to Expression 1 below.

The term "Z" indicated in Expression 1 below is the amount of blur per unit time indicated by the control information (expressed in units of [mm], for example). Also, the term "$d_1$" indicated in Expression 1 below represents the amount of movement of the focus lens L1 (expressed in units of [mm], for example), while the term "$d_2$" indicated in Expression 1 below represents the amount of movement of the focus lens L2 (expressed in units of [mm], for example).

In addition, the term "$PK_1$" indicated in Expression 1 below represents the focus point sensitivity of the focus lens L1, while the term "$PK_2$" indicated in Expression 1 below represents the focus point sensitivity of the focus lens L2.

Herein, the focus point sensitivity is the amount of movement of the image plane in a direction orthogonal to the optical axis direction on the image sensor when the focus lens is operated for the unit time, and is a known value. For example, if the image plane moves 3 [mm] in the positive direction of a direction orthogonal to the optical axis direction when a certain focus lens moves 1 [mm], a focus point sensitivity PK=3 is computed. As another example, if the image plane moves 3 [mm] in the negative direction of a direction orthogonal to the optical axis direction when a certain focus lens moves 1 [mm], a focus point sensitivity PK=−3 is computed. The lens unit according to the present embodiment acquires data indicating the focus point sensitivity corresponding to each focus lens by reading out data from a recording medium or the like provided in the lens unit according to the present embodiment, for example.

$$Z = d_1 \cdot PK_1 + d_2 \cdot PK_2 \qquad \text{(Expression 1)}$$

Herein, the focus point sensitivity of a focus lens does not change greatly when the position of the focus lens is out-of-range, and thus the effects of change in the focus point sensitivity may be ignored. In this case, the burden ratio of the amount of blur (proportion of the amount of blur) for each focus lens depends on the amount of movement $d_1$ of the focus lens L1 and the amount of movement $d_2$ of the focus lens L2.

The lens unit according to the present embodiment determines the amount of movement $d_1$ of the focus lens L1 and the amount of movement $d_2$ of the focus lens L2 so that Expression 1 above is satisfied, and also so that the proportion of the amount of blur of each focus lens is different.

More specifically, in the case in which the position of each focus lens is out-of-range, the lens unit according to the present embodiment controls the movement of the multiple focus lenses as indicated in (2-1) to (2-4) below, for example. For example, by controlling the movement of the multiple focus lenses as indicated in (2-1) to (2-4) below, the "amount of movement per unit time of each focus lens in the case in which the position of each focus lens is out-of-range" may be made different from the "amount of movement per unit time of each focus lens in the case in which the position of each focus lens is in-range".

(2-1) First Example

When the position of each focus lens is out-of-range, the lens unit according to the present embodiment performs control so as to stop the movement of at least one focus lens among the multiple focus lenses.

In the lens unit according to the present embodiment, as discussed earlier, the movement of each focus lens is controlled by having the control circuit transmit a control signal to an actuator to control the operation of that actuator, for example. The control circuit, by transmitting a control signal including an instruction to stop operation to an actuator corresponding to at least one focus lens among the multiple focus lenses, for example, stops movement of at least one focus lens among the multiple focus lenses. Note that if the above control signal is transmitted to the actuator while the focus lens is moving (that is, if movement of the focus lens is controlled to be stopped), in actual practice, the focus lens may move during the period between the control signal being transmitted and the focus lens actually stopping, because of movement due to inertia and the like.

As above, by controlling so as to stop the movement of at least one focus lens among the multiple focus lenses, the proportion of the amount of blur of each focus lens may be made different from the case of (1) above. Thus, by controlling so as to stop the movement of at least one focus lens among the multiple focus lenses, the amount of movement per unit time of each focus lens in the out-of-range case may be made different from the amount of movement per unit time of each focus lens in the in-range case.

(2-2) Second Example

When the position of each focus lens is out-of-range, the lens unit according to the present embodiment controls the amount of movement of each of the multiple focus lenses on the basis of one or both of the type of focus lens, and the type of actuator corresponding to each of the multiple focus lenses.

(A) Examples of Control Based on Type of Focus Lens

The type of focus lens may be categorized by mass, for example. To give one example, the types of focus lenses may be "large focus lens" and "small focus lens", for example. A "large focus lens" may be referred to as a "heavy lens", while a "small focus lens" may be referred to as a "light lens" in some cases.

Herein, "large focus lens" and "small focus lens" are classified on the basis of one or multiple properties from among the f-number, mass, and focus point sensitivity, for example.

To give an example, a focus lens classified as a "large focus lens" may be a focus lens classified on the basis of set threshold values like the following, for example.

f-number: 4.0 or less
mass: 100 [g] or more

Also, a focus lens classified as a "small focus lens" may be a focus lens classified on the basis of set threshold values like the following, for example.

f-number: greater than 4.0
mass: approximately 10 [g]

Note that examples of focus lenses classified into "large focus lens" and "small focus lens" are not limited to the examples indicated above.

For example, if the lens unit according to the present embodiment is provided with two focus lenses, the focus lens of greater mass or the focus lens having a smaller f-number may be designated the "large focus lens", while the other focus lens may be designated the "small focus lens".

Additionally, the type of focus lens according to the present embodiment may also be classified by the actuator that operates the focus lens (the actuator corresponding to the focus lens), for example. For example, a focus lens that operates by an ultrasonic motor (particularly a ring-type travelling wave ultrasonic motor) or a direct current (DC) motor is classified as a "large focus lens", while a focus lens that operates by a linear actuator (linear motor), a stepping motor, or a piezo element (piezoelectric element) is classified as a "small focus lens". At this point, for a motor that operates a large focus lens, a reduction drive may also be used to obtain a large torque. Also, a motor that operates a large focus lens is set with a large rotational speed, particularly compared to a motor that operates a small focus lens.

In addition, the type of focus lens according to the present embodiment may also be classified on the basis of the focus point sensitivity as discussed earlier, for example. The examples given below are examples of classifications based on the focus point sensitivity.

If the focus point sensitivity is greater than a preset threshold value (or if the focus point sensitivity is equal to or greater than a preset threshold value), the focus lens is classified as a "small focus lens".

If the focus point sensitivity is less than or equal to a preset threshold value (or if the focus point sensitivity is less than a preset threshold value), the focus lens is classified as a "large focus lens".

If the lens unit according to the present embodiment is provided with two focus lenses, the focus lens having a smaller focus point sensitivity is designated the "large focus lens", while the other focus lens is designated the "small focus lens".

For example, if the type of focus lens is a "large focus lens", the lens unit according to the present embodiment performs control so as to not move that focus lens, or to stop the movement of that focus lens. Herein, in the control according to the second example, controlling so as to stop the movement of a focus lens corresponds to a control combining the control according to the second example with the control according to the first example indicated in (2-1) above (this applies similarly hereinafter).

Note that even if the type of focus lens is a "large focus lens", the focus lens may still be moved if the focus point sensitivity of that focus lens is greater than the set threshold value (or if the focus point sensitivity is equal to or greater than the threshold value). Herein, the threshold value may be a preset, fixed value, or a variable value that may be modified on the basis of a user operation or the like.

The example given below is an example of control in the case of moving a focus lens when the type of the focus lens is a "large focus lens".

If the multiple focus lenses include a combination of a focus lens corresponding to a "large focus lens" and a focus lens corresponding to a "small focus lens", the lens unit according to the present embodiment controls the focus lens corresponding to the "large focus lens" to have a smaller amount of movement than when the type of focus lens is a "small focus lens".

By controlling as above when the type of focus lens is a "large focus lens", the power consumption related to focus lens movement may be decreased further.

As another example, the examples given below are examples of control when the type of the focus lens is a "small focus lens".

If the type of focus lens is a "small focus lens", the lens unit according to the present embodiment moves that focus lens.

If the multiple focus lenses include a combination of a focus lens corresponding to a "large focus lens" and a focus lens corresponding to a "small focus lens", the lens unit according to the present embodiment controls the focus lens corresponding to the "small focus lens" to have a greater amount of movement than when the type of focus lens is a "large focus lens".

The examples given above are examples of control based on the type of focus lens. However, control based on the type of focus lens is not limited to the examples indicated above. The lens unit according to the present embodiment may also specify the type of focus lens on the basis of arbitrary information enabling the specification of a focus lens (for example, data indicating a serial number of a focus lens), and conduct control corresponding to the type of the specified focus lens.

(B) Examples of Control Based on Type of Actuator

Types of actuators may include, for example, types classified by the focus lens that the actuator is capable of moving, and types classified by power consumption.

For example, the examples given below are examples of types classified by the focus lens that the actuator is capable of moving.

Actuator capable of moving a "large focus lens", such as an ultrasonic motor or a DC motor, for example Actuator capable of moving a "small focus lens", such as a linear actuator, a stepping motor, or a piezo element (piezoelectric element), for example At this point, for example, if an ultrasonic motor or a DC motor is used as an actuator, the focus lens cannot be driven directly by the actuator, and thus the positioning of the focus lens is performed by providing a reduction mechanism between the actuator and the focus lens. As another example, if a linear actuator, a stepping motor, or a piezo element (piezoelectric element) is used as an actuator, the focus lens may be driven directly by the actuator, and thus the above reduction mechanism is not provided.

If the type of actuator is an actuator capable of moving a "large focus lens", the lens unit according to the present embodiment performs control so as to not move the focus lens corresponding to that actuator, or to stop the movement of the focus lens corresponding to that actuator, for example. Also, if the multiple focus lenses include a combination of a focus lens corresponding to a "large focus lens" and a focus lens corresponding to a "small focus lens", the lens unit according to the present embodiment may also control the focus lens corresponding to the "large focus lens" so that the amount of movement of the focus lens corresponding to the actuator is less than the case of an actuator capable of moving a "small focus lens", for example.

Also, if the type of actuator is an actuator capable of moving a "small focus lens", the lens unit according to the present embodiment controls moves the focus lens corresponding to that actuator. Also, if the multiple focus lenses include a combination of a focus lens corresponding to a "large focus lens" and a focus lens corresponding to a "small focus lens", the lens unit according to the present embodiment controls the focus lens corresponding to the "small focus lens" so that the amount of movement of the focus lens corresponding to the actuator is greater than the case of an actuator capable of moving the "large focus lens".

In addition, the examples given below are examples of types classified by power consumption. Types classified by power consumption are classified on the basis of a result of a comparison between the power consumption and a set power consumption threshold value.

Actuator whose power consumption is equal to or greater than the set power consumption threshold value (or actuator whose power consumption is greater than the set power consumption threshold value; this applies similarly hereinafter), such as an ultrasonic motor or a DC motor, for example Actuator whose power consumption is less than the set power consumption threshold value (or actuator whose power consumption is less than or equal to the set power consumption threshold value; this applies similarly hereinafter), such as a linear actuator, a stepping motor, or a piezo element (piezoelectric element), for example If the type of actuator is an actuator whose power consumption is equal to or greater than the set power consumption threshold value, the lens unit according to the present embodiment performs control so as to not move the focus lens corresponding to that actuator, or to stop the movement of the focus lens corresponding to that actuator, for example. In addition, the lens unit according to the present embodiment may also perform control so that the amount of movement of the focus lens corresponding to the actuator is less than the case of an actuator whose power consumption is less than the set power consumption threshold value, for example.

In addition, if the type of actuator is an actuator whose power consumption is less than the set power consumption threshold value, the lens unit according to the present embodiment performs control so that the amount of movement of the focus lens corresponding to the actuator is greater than the case of an actuator whose power consumption is equal to or greater than the set power consumption threshold value, for example.

The examples given above are examples of control based on the type of actuator. However, control based on the type of actuator is not limited to the examples indicated above. The lens unit according to the present embodiment may also conduct control corresponding to a focus control method supported by the actuator, a servo mechanism method supported by the actuator (desired method), or the like.

(C) Example of Control Based on Type of Focus Lens and Type of Actuator

The lens unit according to the present embodiment may also control the amount of movement of each of the multiple focus lenses on the basis the type of focus lens and the type of actuator.

To give an example, if the type of focus lens is a "large focus lens" and the type of actuator is an actuator capable of moving a "large focus lens", the lens unit according to the present embodiment performs control so as to not move that focus lens, or to stop the movement of that focus lens. In addition, if the type of focus lens is a "small focus lens" and the type of actuator is an actuator capable of moving a "large focus lens", the lens unit according to the present embodiment performs control so that the amount of movement of the focus lens is greater than the case of other combinations of a type of focus lens and a type of actuator.

(2-3) Third Example

When the position of each focus lens is out-of-range, the lens unit according to the present embodiment controls the amount of movement of each of the multiple focus lenses on the basis of the inter-group distance among the multiple focus lenses.

Herein, the inter-group distance according to the present embodiment is the interval between focus lenses. The inter-group distance of focus lenses used in contrast AF is determined by the following factors, for example.

Optical performance of the lens unit

Physical size (thickness) of the focus lenses

Mechanical members constituting actuators

Desirable range of motion for contrast AF

Amount of focus point correction (such as aperture) during imaging

Flange back error in imaging unit (this corresponds to the body of the imaging device, for example) corresponding to lens unit (for the case in which the imaging device is an imaging device with an interchangeable lens, for example)

The lens unit according to the present embodiment performs control corresponding to the inter-group distance by referencing, for example, a table (or a database) associating the inter-group distance with the amount of movement of each focus lens, for example.

In the lens unit according to the present embodiment, satisfactory optical performance is not required when out-of-range. Thus, the control corresponding to the inter-group distance may be, for example, control that does not provide satisfactory optical performance out-of-range and also does not produce interference due to the inter-group distance (which is set without considering satisfactory optical performance), or alternatively, control that does not provide satisfactory optical performance out-of-range and also moves the multiple focus lenses near the limit of the inter-group distance (which is set without considering satisfactory optical performance). When control corresponding to the inter-group distance is performed, the inter-group distance is set so as not to produce satisfactory optical performance out-of-range.

(2-4) Fourth Example

When the position of each focus lens is out-of-range, the lens unit according to the present embodiment controls the amount of movement of each of the multiple focus lenses on the basis of a priority set for each of the multiple focus lenses. The priority is set on the basis of an index related to the focus lens, such as the focus point sensitivity or the mass, for example. In addition, the priority may be a preset, fixed value, or a variable value that may be modified on the basis of a user operation or the like.

As an example of control based on priority, the amount of movement is preferentially controlled for the focus lens with the highest priority, and the amount of movement for an other focus lens is controlled in correspondence with the control of the preferentially controlled focus lens. Herein, the control for the focus lens with the highest priority may be controlling so as to move that focus lens, not moving that focus lens, or stop the movement of that focus lens. In the example of control based on priority indicated above, the focus lens with the highest priority corresponds to a "primary focus lens", while the other focus lens corresponds to a "secondary focus lens", for example.

Figure 3:
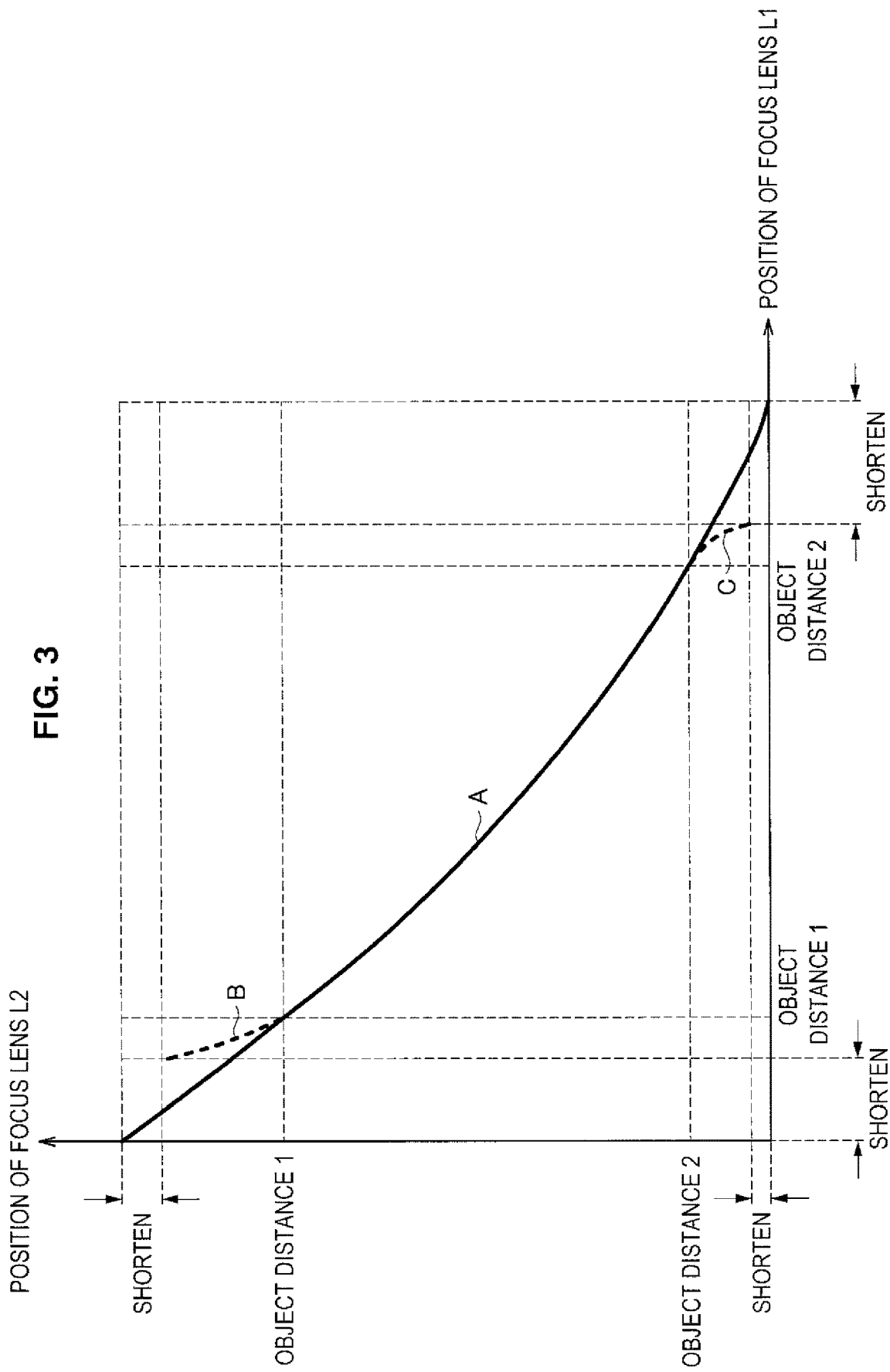
FIG. 3 is an explanatory diagram for illustrating a control method according to an embodiment.
Figure 4:
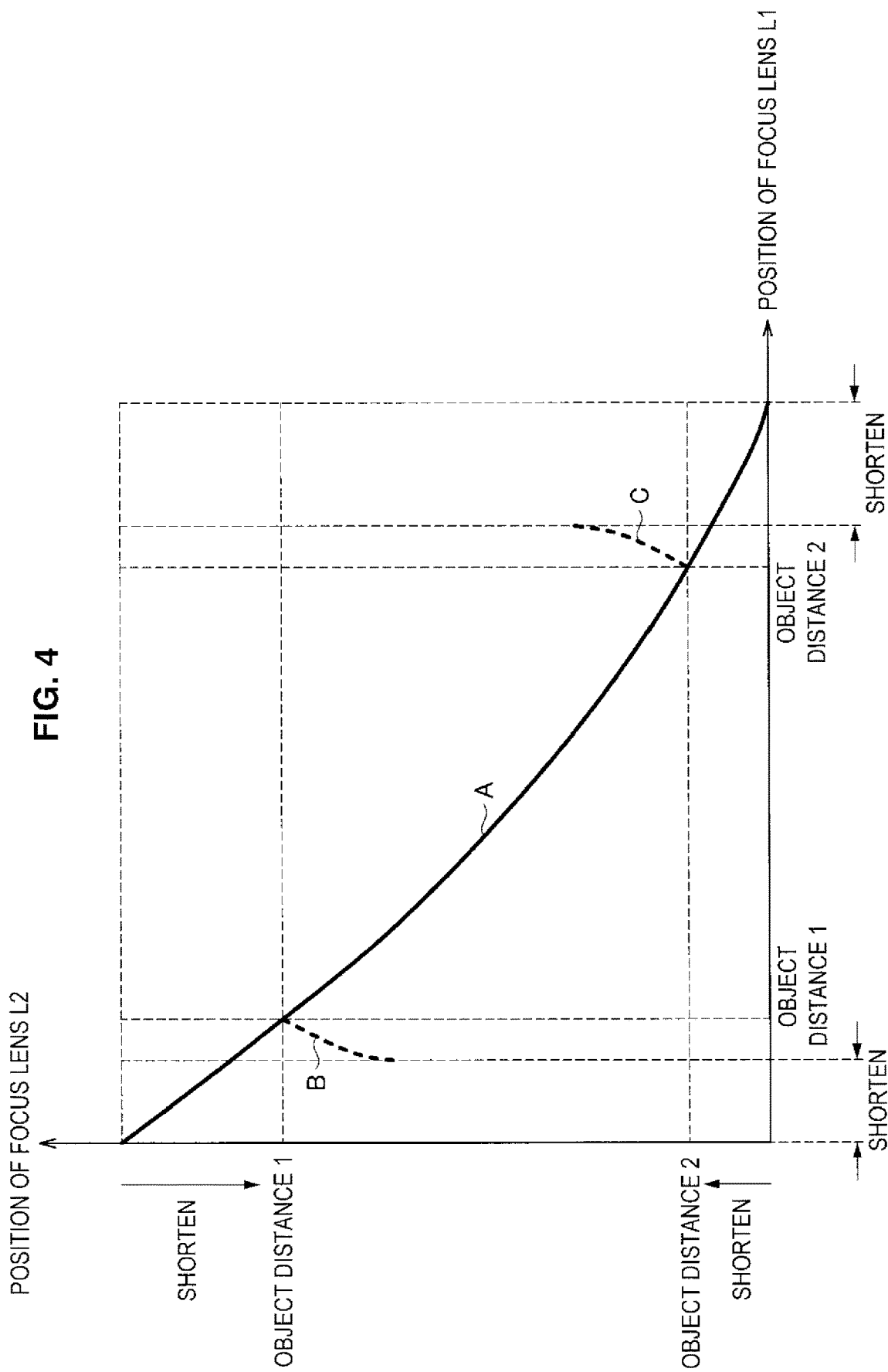
FIG. 4 is an explanatory diagram for illustrating a control method according to an embodiment.

FIGS. 3 and 4 are explanatory diagrams for illustrating a control method according to the present embodiment, and illustrate an example of controlling focus lens position, whish is realized by conducting the movement control process according to the present embodiment. FIGS. 3 and 4 illustrate an example of controlling the positions of the focus lens L1 and the focus lens L2 in the lens unit illustrated in FIG. 1.

The label A in FIG. 3 and the label A in FIG. 4 indicate an example of the positional relationship of the focus lens L1 and the focus lens L2, which is realized in accordance with the relationship of satisfactory optical performance between the amount of blur and the amount of movement discussed earlier. Also, the label B in FIG. 3 and the label B in FIG. 4 illustrate an example of the positional relationship of the focus lens L1 and the focus lens L2 at an out-of-range position exceeding the position corresponding to the object distance 1 (the position corresponding to infinity). Also, the label C in FIG. 3 and the label C in FIG. 4 illustrate an example of the positional relationship of the focus lens L1 and the focus lens L2 at an out-of-range position exceeding the position corresponding to the object distance 2 (the position corresponding to the minimum object distance).

(a) First Example of Control of Focus Lens Position (FIG. 3)

If the focus point sensitivity of the focus lens L1 and the focus point sensitivity of the focus lens L2 have the same sign, the lens unit according to the present embodiment controls the positions of the focus lens L1 and the focus lens L2 out-of-range as indicated by the labels B and C in FIG. 3, for example.

As discussed earlier, when out-of-range, the lens unit according to the present embodiment determines the amount of movement d1 of the focus lens L1 and the amount of movement d2 of the focus lens L2 so that Expression 1 above is satisfied, and also so that the proportion of the amount of blur of each focus lens is different.

Thus, the amount of blur when the control of satisfactory optical performance labeled A in FIG. 3 is conducted out-of-range is the same as the amount of blur when the controls labeled B and C in FIG. 3 are conducted out-of-range. In other words, when out-of-range past the position corresponding to the object distance 1 (the position corresponding to infinity), the amount of blur indicated by the solid line (A in FIG. 3) and the amount of blur indicated by the dashed line (B in FIG. 3) are the same. Also, when out-of-range past the position corresponding to the object distance 2 (the position corresponding to the minimum object distance), the amount of blur indicated by the solid line (A in FIG. 3) and the amount of blur indicated by the dashed line (C in FIG. 3) are the same.

(b) Second Example of Control of Focus Lens Position (FIG. 4)

If the focus point sensitivity of the focus lens L1 and the focus point sensitivity of the focus lens L2 have different signs, the lens unit according to the present embodiment controls the positions of the focus lens L1 and the focus lens L2 out-of-range as indicated by the labels B and C in FIG. 4, for example.

As discussed earlier, when out-of-range, the lens unit according to the present embodiment determines the amount of movement d1 of the focus lens L1 and the amount of movement d2 of the focus lens L2 so that Expression 1 above is satisfied, and also so that the proportion of the amount of blur of each focus lens is different. At this point, if the focus point sensitivity of the focus lens L1 and the focus point sensitivity of the focus lens L2 have different signs, to ensure the amount of blur in the same direction, the lens unit according to the present embodiment determines the amount of movement d1 of the focus lens L1 and the amount of movement d2 so that the actuator corresponding to the focus lens L1 and the actuator corresponding to the focus lens L2 are driven in opposite directions. In other words, when the position of each of the multiple focus lenses changes from in-range to out-of-range, the lens unit according to the present embodiment may perform control to change the movement direction of at least one focus lens.

Thus, in the second example of control of focus lens position, similarly to the first example of control of focus lens position illustrated in FIG. 3, the amount of blur when the control of satisfactory optical performance labeled A in FIG. 4 is conducted out-of-range is the same as the amount of blur when the controls labeled B and C in FIG. 4 are conducted out-of-range. In other words, when out-of-range past the position corresponding to the object distance 1 (the position corresponding to infinity), the amount of blur indicated by the solid line (A in FIG. 4) and the amount of blur indicated by the dashed line (B in FIG. 4) are the same. Also, when out-of-range past the position corresponding to the object distance 2 (the position corresponding to the minimum object distance), the amount of blur indicated by the solid line (A in FIG. 4) and the amount of blur indicated by the dashed line (C in FIG. 4) are the same.

The lens unit according to the present embodiment controls the positions of the focus lens L1 and the focus lens L2 as illustrated in FIG. 3 or 4 for the in-range case and the out-of-range case, for example.

Figure 5:
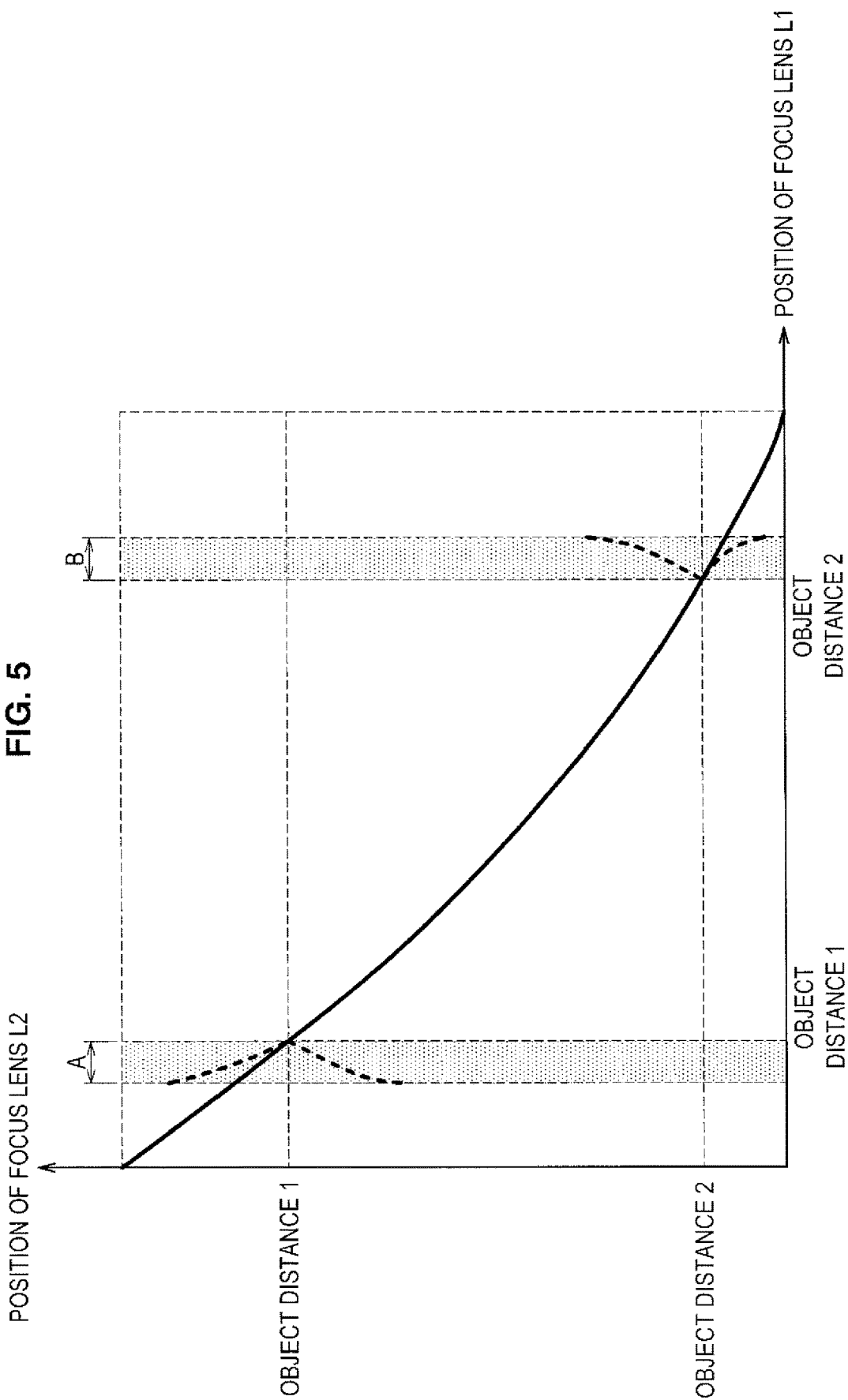
FIG. 5 is an explanatory diagram for illustrating a control method according to an embodiment.

FIG. 5 is an explanatory diagram for illustrating a control method according to the present embodiment, and summarizes in one drawing the controls of the positions of the focus lens L1 and the focus lens L2 illustrated in FIGS. 3 and 4.

As discussed above, while out-of-range, the amount of blur when control of satisfactory optical performance is conducted (for example, the case of A in FIG. 3 or A in FIG. 4) is the same as the amount of blur when the control according to the movement control process is conducted (for example, the case of B in FIG. 3, C in FIG. 3, B in FIG. 4, or C in FIG. 4). Also, taking the focus lens L1 in particular, the ranges of motion of the focus lens L1 while out-of-range become the ranges labeled A and B in FIG. 5, which are shorter than the ranges of motion of the focus lens L1 when the control of satisfactory optical performance is conducted (for example, the case of A in FIG. 3 or A in FIG. 4).

Thus, the lens unit according to the present embodiment is able to shorten the range of motion of the focus lens L1 while out-of-range, while still being able to acquire contrast values for conducting contrast AF. Additionally, in the lens unit according to the present embodiment, similar advantageous effects are also obtained for other focus lenses provided in the lens unit according to the present embodiment, such as the focus lens L2.

Consequently, by conducting the movement control process according to a control method in accordance with the present embodiment, the lens unit according to the present embodiment is able to resolve an insufficiency of focus lens movement which may occur when conducting contrast autofocus, as labeled D in FIG. 2, for example.

Additionally, by the control method according to the present embodiment, the range of motion of each of the multiple focus lenses while out-of-range may be shortened, thereby making it easier to miniaturize the lens unit according to the present embodiment.

Furthermore, in the movement control process according to a control method in accordance with the present embodiment, control of satisfactory optical performance is performed while in-range, thereby preventing degraded optical performance due to the control method in accordance with the present embodiment.

(Lens unit and Imaging Device According to Present Embodiment)

Next, a configuration of a lens unit according to the present embodiment that is able to conduct a process according to a control method in accordance with the present embodiment discussed above, and a configuration of an imaging device according to the present embodiment that is equipped with the lens unit according to the present embodiment, will be described.

[1] Example of Configuration of Lens Unit According to Present Embodiment

Figure 6:
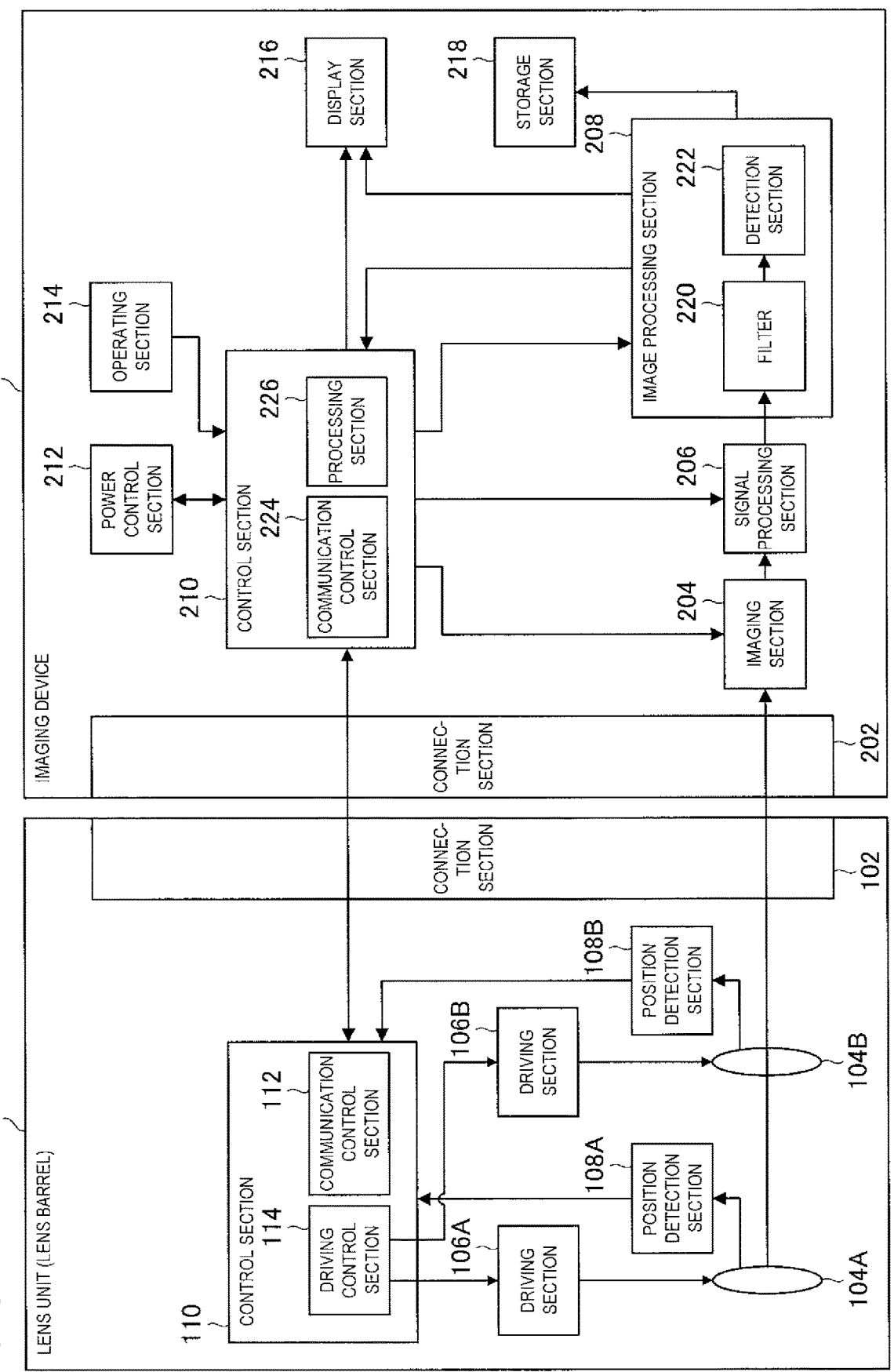
FIG. 6 is a block diagram illustrating an example of a configuration of a lens unit according to an embodiment.

FIG. 6 is a block diagram illustrating an example of a configuration of a lens unit 100 according to the present embodiment. FIG. 6 additionally illustrates an example of a configuration of an imaging device 200 which, together with the lens unit 100, constitutes the system of a digital camera with an interchangeable lens. In the system of a digital camera with an interchangeable lens illustrated in FIG. 6, the lens unit 100 functions as the interchangeable lens. Also, in the system of a digital camera with an interchangeable lens illustrated in FIG. 6, the imaging device 200 functions as the main camera unit (also called the body). In addition, the imaging device 200 corresponds to an example of the imaging unit discussed earlier. Hereinafter, an example of a configuration of the lens unit 100 will be described, with reference to the lens unit 100 illustrated in FIG. 6 and the imaging device 200 illustrated in FIG. 6 as appropriate.

[1-1] Imaging Device 200

The imaging device 200 is equipped with a connection section 202, an imaging section 204, a signal processing section 206, an image processing section 208, a control section 210, a power control section 212, an operating section 214, a display section 216, and a storage section 218, for example.

The imaging device 200 may also be equipped with components such as read-only memory (ROM; not illustrated) and random access memory (RAM; not illustrated), for example. The above structural elements of imaging device 200 are interconnected by a bus that acts as a data transmission line, for example. The imaging device 200 is driven with power supplied from an internal power source, such as a battery provided in the imaging device 200, or with power supplied from a connected external power source, for example.

The above ROM stores programs and control data, such as computational parameters, used by the control section 210. The above RAM temporarily stores information such as programs executed by the control section 210 and the like, for example.

On the connection section 202, a mount to which the lens unit 100 may be removably attached is provided. Near the mount constituting the connection section 202, a holding member that holds one or multiple electrical contacts is provided in a partially protruding state on the inner circumference of the mount.

When a connection section 102 of the lens unit 100 discussed later is attached to the connection section 202 of the imaging device 200, a mount constituting the connection section 202 provided with multiple electrical contacts is electrically and physically connected to the mount constituting the connection section 102. By electrically connecting the connection section 202 and the connection section 102, power supply from the imaging device 200 to the lens unit 100, as well as communication between the imaging device 200 and the lens unit 100, become possible, for example.

The imaging section 204 is an image sensor using multiple photo sensors such as a complementary metal-oxide-semiconductor (CMOS) sensor or a charge-couple device (CCD) sensor, and outputs an image signal corresponding to light received through the lens unit 100.

The signal processing section 206 performs processes such as demosaicing on the image signal acquired from the imaging section 204, and generates data expressing a RAW image.

The image processing section 208 processes the image signal acquired from the signal processing section 206. For example, in the case of recording a RAW image in the storage section 218, the image processing section 208 losslessly compresses the RAW image, and causes the storage section 218 to record the losslessly compressed image data. In addition, the image processing section 208 may also losslessly compress a RAW image after first performing a process such as gamma correction, for example, and then cause the storage section 218 to record the losslessly compressed image data.

The image processing section 208 also includes a filter 220 and a detection section 222, for example.

The filter 220 removes noise components from the image signal acquired from the signal processing section 206. The filter 220 may be any arbitrary filter capable of removing noise components, such as a smoothing filter.

The detection section 222 includes a detector circuit, for example, and detects the signal with noise components removed by the filter 220. With the detection by the detector circuit, data indicating contrast (for example, data indicating contrast AF detection values; this is an example of a detection result of a signal obtained by imaging) is obtained, for example.

The control section 210 includes one or multiple processors made up of a computational circuit such as a microprocessing unit (MPU), for example, and controls the imaging device 200 overall.

The processor constituting the control section 210 fulfills the role of a blur amount control circuit that controls the amount of blur, for example, and controls the amount of blur during imaging. Also, the processor constituting the control section 210 functions as a communication controller, and fulfills a role of controlling wired communication or wireless communication with an external device such as the lens unit 100.

The control section 210 includes a communication control section 224 and a processing section 226, for example.

The communication control section 224 fulfills the role of controlling wired communication or wireless communication with an external device such as the lens unit 100.

The processing section 226 determines the amount of blur per unit time, on the basis of a detection result obtained from the detector circuit constituting the detection section 222 (a detection result of a signal obtained by imaging through the lens unit 100), for example. Subsequently, the communication control section 224 causes control information indicating an amount of blur determined by the processing section 226 to be transmitted to the lens unit 100.

Figure 7:
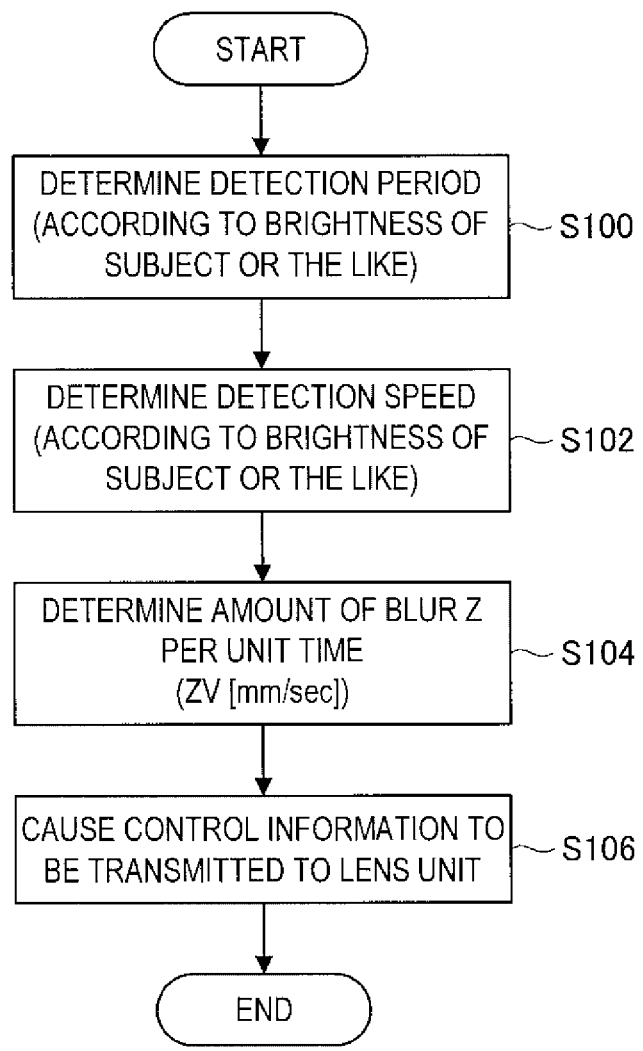
FIG. 7 is a flowchart illustrating an example of a process conducted by the imaging device illustrated in FIG. 6.

FIG. 7 is a flowchart illustrating an example of a process by the imaging device 200 according to the present embodiment, and illustrates an example of a process by the control section 210 provided in the imaging device 200.

The control section 210 determines a detection period (S100), and determines a detection speed (S102). The detection period is determined by a subject brightness estimated from a signal obtained by imaging through the lens unit 100, or by a subject brightness estimated on the basis of a detection value from a sensor such as a luminance sensor.

The control section 210 determines the amount of blur Z per unit time, on the basis of a detection result obtained from the detector circuit constituting the detection section 222 (a detection result of a signal obtained by imaging through the lens unit 100), for example (S104). The control section 210 determines the amount of blur Z per unit time by referencing a table (or database) associating the contrast AF detection value with the amount of blur Z, or by computing according to an arbitrary algorithm capable of obtaining the amount of blur Z based on the contrast AF detection value, for example.

Subsequently, the control section 210 causes control information indicating the amount of blur Z determined in step S104 to be transmitted to the lens unit 100 (S106).

The control section 210 conducts the process illustrated in FIG. 7, for example. Obviously, however, the example of the process by the control section 210 is not limited to the example illustrated in FIG. 7.

Referring again to FIG. 6, an example of a configuration of the imaging device 200 will be described. The power control section 212 includes a processor or the like, and performs control related to the power supplied from an internal power source (not illustrated) such as a battery provided in the imaging device 200, or from an external power source. The power control section 212 performs power-related control on the basis of the operational status of the imaging device 200, such as the state of processing in the control section 210, for example. To give an example, the power control section 212 computes an amount of power that may be supplied to the lens unit 100 on the basis of the operational status of the imaging device 200, and supplies power to the lens unit 100 through the connection section 202.

The operating section 214 is an operating section provided in the imaging device 200, and includes operating devices such as buttons, a touch panel, and a rotary operating member. A user using the imaging device 200 operates the operating section 214 to perform actions such as setting the imaging mode and setting imaging parameters, for example.

The display section 216 is a display section provided in the imaging device 200, and causes a display screen to display screens, such as a screen presenting various images (moving images or still images) such as a live view image or a preview image, and a screen presenting a UI. The display section 216 includes a display device such as a liquid crystal display (LCD) or an organic electro-luminescence display (organic EL display), for example.

The storage section 218 is a storage section provided in the imaging device 200, and stores various data such as image data. The storage section 218 may be non-volatile memory, for example. The storage section 218 may also be removable from the imaging device 200.

With the configuration illustrated in FIG. 6, for example, the imaging device 200 transmits control information indicating the amount of blur per unit time to the lens unit 100. Obviously, however, the configuration of the imaging device 200 is not limited to the configuration illustrated in FIG. 6.

[1-2] Lens Unit 100

The lens unit 100 is equipped with a connection section 102, focus lenses 104A and 104B, driving sections 106A and 106B, position detection sections 108A and 108B, and a control section 110, for example. The lens unit 100 is driven with power supplied from an internal power source, such as a battery provided in the lens unit 100, or with power supplied from a connected external power source (for example, power supplied from the imaging device 200), for example.

On the connection section 102, a mount to which the imaging device 200 may be removably attached is provided. Near the mount constituting the connection section 102, a holding member that holds one or multiple electrical contacts is provided in a partially protruding state on the inner circumference of the mount.

As discussed above, when the connection section 102 of the lens unit 100 is attached to the connection section 202 of the imaging device 200, the mount constituting the connection section 202 provided with multiple electrical contacts is electrically and physically connected to the mount constituting the connection section 102. By electrically connecting the connection section 202 and the connection section 102, power supply from the imaging device 200 to the lens unit 100, as well as communication between the imaging device 200 and the lens unit 100, become possible, for example.

The focus lens 104A is a first focus lens provided in the lens unit 100. The focus lens 104A is made up of one focus lens or multiple focus lenses. Also, in FIG. 6, the focus lens 104A is the focus lens provided closer to the subject than the other focus lens 104B.

The focus lens 104B is the other focus lens provided in the lens unit 100. The focus lens 104B is made up of one focus lens or multiple focus lenses. The focus lens 104B may include the same type of focus lens as the focus lens 104A, or a different type of focus lens.

The focus lenses 104A and 104B are provided in a lens barrel (not illustrated). Note that, as indicated with reference to FIG. 1, other lenses such as a zoom lens may also be provided in the lens barrel.

The driving section 106A includes an actuator such as a linear actuator, a stepping motor, a piezo element (piezoelectric element), an ultrasonic motor, or a DC motor, for example. The actuator constituting the driving section 106A is the actuator corresponding to the focus lens 104A, and drives the focus lens 104A inside the lens barrel according to a control signal transmitted from the control section 110.

The driving section 106B includes an actuator such as a linear actuator, a stepping motor, a piezo element (piezoelectric element), an ultrasonic motor, or a DC motor, for example. The actuator constituting the driving section 106B is the actuator corresponding to the focus lens 104B, and drives the focus lens 104B inside the lens barrel according to a control signal transmitted from the control section 110. The actuator constituting the driving section 106B may be the same type of actuator as the actuator constituting the driving section 106A, or a different type of actuator.

The position detection section 108A detects the position inside the lens barrel of the focus lens 104A, while the position detection section 108B detects the position inside the lens barrel of the focus lens 104B. The position detection sections 108A and 108B include an arbitrary position detection sensor capable of detecting the position of a focus lens, such as a position detection sensor made up of a magnet and a magnetic detection sensor, for example.

The control section 110 includes one or multiple processors made up of a computational circuit such as an MPU, for example, and controls the lens unit 100 overall.

The processor constituting the control section 110 fulfills a role of a control circuit that is primarily responsible for conducting the movement control process according to the control method in accordance with the present embodiment, and controls the movement of the multiple focus lenses 104A and 104B. The processor constituting the control section 110 functions as a communication controller, and fulfills a role of controlling wired communication or wireless communication with an external device such as the imaging device 200.

The control section 110 includes a communication control section 112 and a driving control section 114, for example.

The communication control section 112 fulfills the role of controlling wired communication or wireless communication with an external device such as the imaging device 200.

The driving control section 114 controls the movement of the focus lenses 104A and 104B inside the lens barrel by controlling the operation of the actuator constituting each of the driving sections 106A and 106B. The driving control section 114 determines the position of the focus lenses 104A and 104B inside the lens barrel on the basis of position-indicating information transmitted from each of the position detection sections 108A and 108B.

To give an example, when the actuator constituting each of the driving sections 106A and 106B is an actuator that supports control by driving a focus lens with small amplitudes (called "wobbling"; hereinafter, such control is designated "wobbling control"), the driving control section 114 may also conduct wobbling control. The driving control section 114 conducts wobbling control when a moving image is captured through the lens unit 100, for example. By conducting wobbling control in the driving control section 114, for example, the lens unit 100 and the imaging device 200 become able to work in conjunction to detect the positions of the focus lenses 104A and 104B at which the contrast value reaches a maximum, on the basis of the magnitudes of contrast values obtained by imaging.

In addition, in the case of conducting wobbling control, the driving control section 114 switches the focus lens to operate by wobbling control according cases like those indicated in (i) to (iii) below, for example.

(i) Case in Which Low Power is Demanded

The driving control section 114 decreases power consumption by conducting wobbling control on only one focus lens.

For example, if one of the focus lenses 104A and 104B is a "large focus lens" while the other is a "small focus lens", the driving control section 114 conducts wobbling control on the focus lens corresponding to the "small focus lens". Actuators that support wobbling control include, for example, a stepping motor, a linear actuator, and a piezo element.

(ii) Case in Which Large Blur is Produced during Imaging

The driving control section 114 conducts wobbling control on two focus lenses. In addition, by controlling the amount of blur Z on the basis of Expression 1 above, for example, the driving control section 114 decreases the amplitude of the focus lenses to reduce tactility and noise.

(iii) Case in Which Reduced Tactility and Noise is Demanded

The driving control section 114 conducts wobbling control on two focus lenses. In addition, by controlling the amount of blur Z on the basis of Expression 1 above, for example, the driving control section 114 inverts the driving phase by 180 [degrees] to cancel out the force produced and reduce tactility and noise.

In addition, the driving control section 114 causes information indicating the lens position to be transmitted to an external device, such as the imaging device 200 electrically connected through the connection section 102. At this point, the information indicating the lens position for the case in which the lens unit according to the present embodiment includes one focus lens may be data indicating the position of that focus lens detected by a position detection section, for example. Also, examples of information indicating the lens position for the case in which the lens unit according to the present embodiment includes multiple focus lenses include, for example, data indicating the position of each of the multiple focus lenses, or data indicating a virtual position when treating the multiple focus lenses as a single focus lens.

In addition, the driving control section 114 fulfills a role of a control circuit that is primarily responsible for conducting the movement control process according to the control method in accordance with the present embodiment, and controls the movement of the multiple focus lenses 104A and 104B on the basis of control information.

The driving control section 114 conducts the movement control process on the basis of control information acquired from the imaging device 200 by communication with the imaging device 200 controlled by the communication control section 112, for example.

Figure 8:
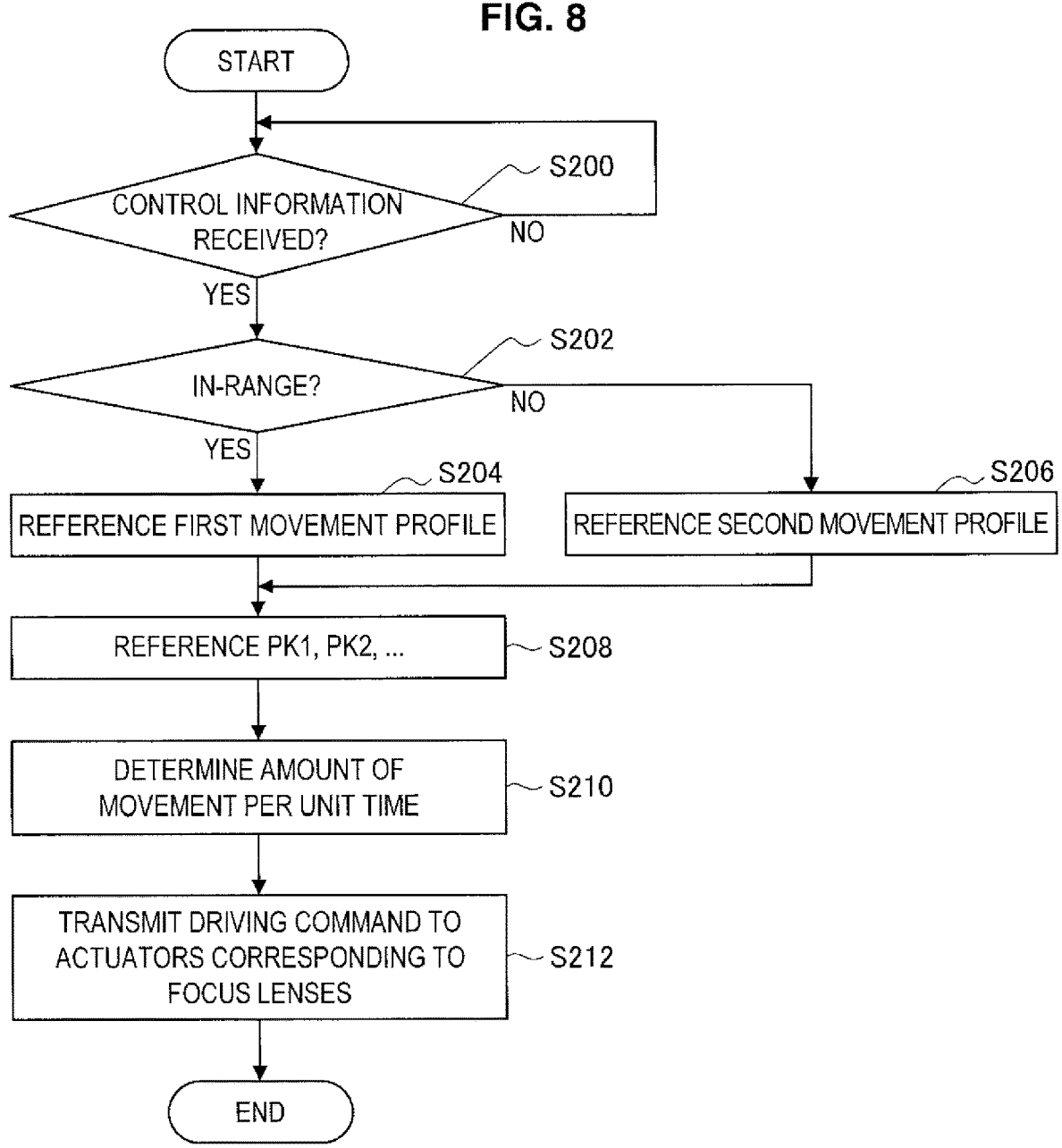
FIG. 8 is a flowchart illustrating an example of a process conducted by a lens unit according to an embodiment.

FIG. 8 is a flowchart illustrating an example of a process by the lens unit 100 according to the present embodiment, and illustrates an example of a process by the control section 110 provided in the lens unit 100.

The control section 110 determines whether or not control information was received (S200). If control information was transmitted from the connection section 102, the control section 110 determines that control information was received.

In the case of determining that control information was received in step S200, the control section 110 does not advance the process until determining that control information was received.

Also, in the case of determining that control information was received in step S200, the control section 110 determines whether or not the positions of the focus lenses 104A and 104B are in-range (S202). The control section 110 determines whether or not the positions are in-range on the basis of position-indicating information transmitted from each of the position detection sections 108A and 108B.

In the case of determining that the positions are in-range in step S202, the control section 110 references a first movement profile corresponding to the in-range case (S204). The first movement profile may be, for example, data indicating a relational expression between focus lenses (this corresponds to the relational expression of satisfactory optical performance expressing a relationship between the amount of blur and the amount of movement discussed earlier), or a relational table for the in-range case (this corresponds to the table associating the amount of blur with the amount of movement of each focus lens obtained from the above relational expression of satisfactory optical performance discussed earlier).

Also, in the case of not determining that the positions are in-range in step S202, the control section 110 references a second movement profile corresponding to the out-of-range case (S206). The second movement profile may be, for example, a relational table for the out-of-range case (for example, a table associating the amount of blur with the amount of movement of each focus lens in the out-of-range case).

Note that the above relational table for the in-range case and the above relational table for the out-of-range case may be a single table. If the above relational table for the in-range case and the above relational table for the out-of-range case are a single table, the control section 110 switches the movement profile to use for control by changing the reference location in the table according to the determination result in step S202.

Also, in the case of determining that control information was received in step S200, the control section 110 references the focus point sensitivity of the focus lenses (S208). Note that although FIG. 8 illustrates an example in which the processing of step S208 is conducted after the processing of steps S202 to S206, the control section 110 may also conduct the processing of steps S202 to S206 after the processing of step S208, or conduct the processing of steps S202 to S206 and the processing of step S208 in parallel.

The control section 110 determines the amount of movement per unit time of each of the multiple focus lenses, on the basis of the amount of blur indicated by the control information (S210). For example, when the position of each focus lens is in-range, the control section 110 determines the amount of movement per unit time of each of the multiple focus lenses so that the relational expression of satisfactory optical performance is satisfied. As another example, when the position of each focus lens is out-of-range, the control section 110 determines the amount of movement per unit time of each of the multiple focus lenses so as to be controlled like in the first example indicated in (2-1) to the third example indicated in (2-4).

The control section 110 transmits a control signal including a driving command for driving the focus lenses by the amount of movement determined in step S210 to the actuators constituting the driving sections 106A and 106B corresponding to the focus lenses (S212).

The control section 110 conducts the process illustrated in FIG. 8, for example. Obviously, however, the example of the process by the control section 110 is not limited to the example illustrated in FIG. 8.

According to the configuration illustrated in FIG. 6, for example, the lens unit 100 conducts a process according to a control method in accordance with the present embodiment. Consequently, with the configuration illustrated in FIG. 6, the lens unit 100 is able to exhibit the advantageous effects exhibited as a result of conducting a process according to a control method in accordance with the present embodiment.

Note that the configuration of a lens unit 100 able to conduct a processing according to a control method in accordance with the present embodiment is not limited to the configuration illustrated in FIG. 6.

For example, a lens unit able to conduct a process according to a control method in accordance with the present embodiment additionally may be equipped with components such as an operating section (not illustrated) or a power control section (not illustrated).

The operating section (not illustrated) constituting a lens unit includes operating devices such as buttons, a touch panel, and a ring-shaped operating member, for example. A user using the lens unit operates the operating section (not illustrated) to perform actions such as setting the zoom position of the lens and setting an aperture value, for example.

The power control section (not illustrated) constituting a lens unit includes a processor or the like, and fulfills a role of distributing an optimal amount of power to each structural element of the lens unit, on the basis of power supplied from an external device such as the imaging device 200, for example.

In addition, a lens unit able to conduct a process according to a control method in accordance with the present embodiment additionally may be equipped with components such as a mechanism related to shake correction and a mechanism related to aperture correction, for example.

[2] Example of Configuration of Imaging Device According to Present Embodiment

Figure 9:
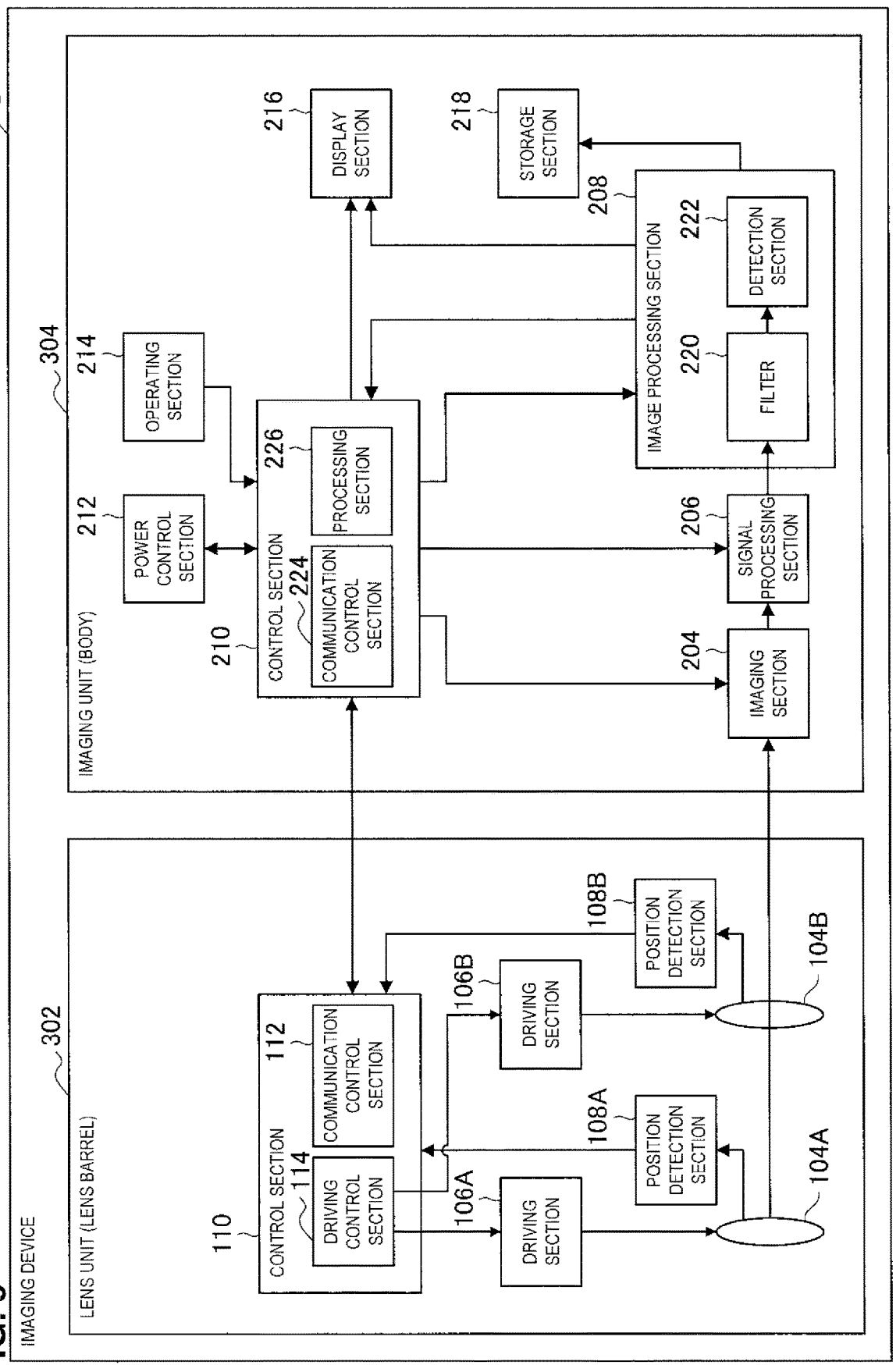
FIG. 9 is a block diagram illustrating an exemplary configuration of an imaging device according to an embodiment.

Next, an example of a configuration of an imaging device according to present embodiment will be illustrated. FIG. 9 is a block diagram illustrating an example of a configuration of an imaging device 300 according to the present embodiment.

The imaging device 300 is equipped with a lens unit 302 and an imaging unit 304, for example.

The lens unit 302 has a configuration basically similar to the lens unit 100 illustrated in FIG. 6. Specifically, the lens unit 302 differs from the lens unit 100 illustrated in FIG. 6 in that the lens unit 302 is not provided with a communication controller for communicating with an external device such as a separate imaging device 200.

In the lens unit 302, a movement control process based on acquired control information is conducted by the driving control section 114, similarly to the lens unit 100 illustrated in FIG. 6. Herein, the control information is transmitted from the imaging unit 304 (specifically, the control section 210).

The imaging unit 304 has a configuration basically similar to the imaging device 200 illustrated in FIG. 6. Specifically, the imaging unit 304 differs from the imaging device 200 illustrated in FIG. 6 in that the imaging unit 304 is not provided with a communication controller for communicating with an external device such as a separate lens unit 100.

In the imaging unit 304, the amount of blur during imaging is controlled by the control section 210, similarly to the imaging device 200 illustrated in FIG. 6. In addition, the control section 210 constituting the imaging unit 304 transmits control information indicating the determined amount of blur to the driving control section 114 of the lens unit 302, which is connected by a wired connection, for example.

With the imaging device 300 illustrated in FIG. 9, in the lens unit 302, a process according to a control method in accordance with the present embodiment is conducted on the basis of control information acquired from the imaging unit 304. Consequently, with the configuration illustrated in FIG. 9, the imaging device 300 is able to exhibit the advantageous effects exhibited as a result of conducting a process according to a control method in accordance with the present embodiment.

However, the configuration of an imaging device according to the present embodiment is not limited to the example illustrated in FIG. 9. For example, the lens unit constituting the imaging device according to the present embodiment may also take a configuration similar to the modification of the lens unit 100 illustrated in FIG. 6.

Although the foregoing describes an imaging device as an example of the present embodiment, the present embodiment is not limited to such an example. The present embodiment is applicable to various equipment capable of being equipped with imaging functions, such as a digital still camera, a digital video camera, a computer such as a personal computer (PC) or a server, an arbitrary wearable device used by being worn on the user's body, such as an eyewear-style device, a watch-style device, or a wristband-style device, a communication device such as a smartphone, a tablet device, a game console, or a moving body such as an automobile. Additionally, the present embodiment may also be applied to a processing integrated circuit (IC) embeddable in equipment like the above, for example.

(Program According to Present Embodiment)

By having a processor or the like in a computer execute a program enabling the execution of a process according to a control method in accordance with the present embodiment (for example, the movement control process discussed above), an insufficiency of focus lens movement that may occur when conducting contrast autofocus may be resolved.

Additionally, by having a processor or the like in a computer execute a program enabling the execution of a process according to a control method in accordance with the present embodiment, the advantageous effects exhibited by a process according to a control method in accordance with the present embodiment discussed above may be exhibited.

It should be understood by those skilled in the art that various modifications, combinations, sub-combinations and alterations may occur depending on design requirements and other factors insofar as they are within the scope of the appended claims or the equivalents thereof.

For example, although the above indicates that a program enabling the execution of a process according to a control method in accordance with the present embodiment is provided, in the present embodiment, the above program may also be provided in conjunction with a recording medium on which the above program is stored.

The foregoing configuration illustrates one example of the present embodiment, and obviously belongs to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A lens unit including:
a plurality of focus lenses;
a plurality of actuators respectively corresponding to the plurality of focus lenses and configured to move each of the plurality of focus lenses; and
control circuity configured to control movement of the plurality of focus lenses according to a rule in a case of a position of at least one of the plurality of focus lenses being outside a designated range of satisfactory optical performance, the rule being different from a rule in a case of the position all of the plurality of focus lenses being inside the range.

(2) The lens unit according to (1), wherein
at least one of the plurality of focus lenses is a lens group made up of a plurality of sub-lenses.

(3) The lens unit according to (1) or (2), wherein
the control circuitry controls the movement of the plurality of focus lenses based on control information indicating an amount of blur per unit time.

(4) The lens unit according to (3), wherein
the control circuitry controls the movement of the plurality of focus lenses so that the amount of blur indicated by the control information is satisfied in the case of the position of each of the focus lenses being inside the range, and also satisfied in the case of being outside the range.

(5) The lens unit according to any one of (1) to (4), wherein
the control circuitry performs control so that an amount of movement per unit time of each of the plurality of focus lenses is different between the case of the position of each of the plurality of focus lenses being inside the range, and the case of being outside the range.

(6) The lens unit according to (5), wherein
the control circuitry performs control to stop the movement of at least one focus lens among the plurality of focus lenses in the case of the position of each of the focus lenses being outside the range.

(7) The lens unit according to (5) or (6), wherein
in the case of the position of each of the focus lenses being outside the range, the control circuitry controls the amount of movement of each of the plurality of focus lenses based on a type of the focus lens.

(8) The lens unit according to any one of (5) to (7), wherein
in the case of the position of each of the focus lenses being outside the range, the control circuitry controls the amount of movement of each of the plurality of focus lenses based on a type of the actuator corresponding to each of the plurality of focus lenses.

(9) The lens unit according to (5), wherein
in the case of the position of each of the focus lenses being outside the range, the control circuitry controls the amount of movement of each of the plurality of focus lenses based on an inter-group distance among the plurality of focus lenses.

(10) The lens unit according to any one of (1) to (9), wherein
the control circuitry performs control to change a movement direction of at least one of the focus lenses based on a change of the position of each of the plurality of focus lenses from being inside the range to being outside the range.

(11) The lens unit according to any one of (1) to (10), wherein
in the case of the position of each of the plurality of focus lenses being inside the range, an object distance based on the plurality of focus lenses is positioned between a minimum object distance and infinity.

(12) An imaging device including:
a lens unit; and
an imaging unit, wherein
the lens unit includes
a plurality of focus lenses,
a plurality of actuators respectively corresponding to the plurality of focus lenses and configured to move each of the plurality of focus lenses, and
a control circuitry configured to control movement of the plurality of focus lenses according to a rule in a case of a position of at least one of the plurality of focus lenses being outside a designated range of satisfactory optical performance, the rule being different from a rule in a case of the position all of the plurality of focus lenses being inside the range.

(13) The imaging device according to (12), wherein
the imaging unit includes a blur amount control circuitry configured to control an amount of blur, and
the control circuitry of the lens unit controls the movement of the plurality of focus lenses based on control information indicating an amount of blur per unit time acquired from the imaging unit.

(14) The imaging device according to (13), wherein
the blur amount control circuitry of the imaging unit determines the amount of blur per unit time on the basis of a detection result of a signal obtained by imaging through the lens unit, and
causes control information indicating the determined amount of blur to be transmitted to the lens unit.

(15) A control method executed by a control circuit of a lens unit, the control method including:
controlling movement of a plurality of focus lenses provided inside a lens barrel according to different rules between a case of a position of each of the plurality of focus lenses being inside a designated range of satisfactory optical performance, and a case of being outside the range.

(16) A lens unit including:
a plurality of focus lenses;
a plurality of actuators respectively corresponding to the plurality of focus lenses and configured to move each of the plurality of focus lenses; and
a control circuitry configured to control movement of the plurality of focus lenses according to a rule in a case of satisfactory optical performance, the rule being different from a rule in a case of unsatisfactory optical performance,
wherein a range of satisfactory optical performance is determined based on a positions of all of the plurality of focus lenses.

(17) The lens unit according to (16), wherein
at least one of the plurality of focus lenses is a lens group made up of a plurality of sub-lenses.

(18) The lens unit according to (16) or (17), wherein
the control circuitry controls the movement of the plurality of focus lenses based on control information indicating an amount of blur per unit time.

(19) The lens unit according to (18), wherein
the control circuitry controls the movement of the plurality of focus lenses so that the amount of blur indicated by the control information is satisfied in the case of the position of each of the focus lenses being inside the range, and also satisfied in the case of being outside the range.

(20) The lens unit according to any one of (16) to (19), wherein
the control circuitry performs control so that an amount of movement per unit time of each of the plurality of focus lenses is different between the case of the position of each of the plurality of focus lenses being inside the range, and the case of being outside the range.

(21) The lens unit according to (20), wherein
the control circuitry performs control to stop the movement of at least one focus lens among the plurality of focus lenses in the case of the position of each of the focus lenses being outside the range.

(22) The lens unit according to (20) or (21), wherein
in the case of the position of each of the focus lenses being outside the range, the control circuitry controls the amount of movement of each of the plurality of focus lenses based on a type of the focus lens.

(23) The lens unit according to any one of (20) to (22), wherein
in the case of the position of each of the focus lenses being outside the range, the control circuitry controls the amount of movement of each of the plurality of focus lenses based on a type of the actuator corresponding to each of the plurality of focus lenses.

(24) The lens unit according to (20), wherein
in the case of the position of each of the focus lenses being outside the range, the control circuitry controls the amount of movement of each of the plurality of focus lenses based on an inter-group distance among the plurality of focus lenses.

(25) The lens unit according to any one of (16) to (24), wherein
the control circuitry performs control to change a movement direction of at least one of the focus lenses based on a change of the position of each of the plurality of focus lenses from being inside the range to being outside the range.

(26) The lens unit according to any one of (16) to (25), wherein
in the case of the position of each of the plurality of focus lenses being inside the range, an object distance based on the plurality of focus lenses is positioned between a minimum object distance and infinity.

(27) A lens unit including:
a plurality of focus lenses;
a plurality of actuators respectively corresponding to the plurality of focus lenses and configured to move each of the plurality of focus lenses; and
a control circuitry configured to control movement of the plurality of focus lenses, so that the plurality of focus lenses satisfy a designated optical performance in a case that an object distance is inside of a designated range, and the plurality of focus lenses does not satisfy the designated optical performance in a case that the objective distance is outside of the designated range.

(28) The lens unit according to (27), wherein
at least one of the plurality of focus lenses is a lens group made up of a plurality of sub-lenses.

(29) The lens unit according to (27) or (28), wherein
the control circuitry controls the movement of the plurality of focus lenses based on control information indicating an amount of blur per unit time.

(30) The lens unit according to (29), wherein
the control circuitry controls the movement of the plurality of focus lenses so that the amount of blur indicated by the control information is satisfied in the case of the position of each of the focus lenses being inside a range, and also satisfied in the case of being outside the range.

(31) The lens unit according to any one of (27) to (30), wherein
the control circuitry performs control so that an amount of movement per unit time of each of the plurality of focus lenses is different between the case of the position of each of the plurality of focus lenses being inside the range, and the case of being outside the range.

(30) The lens unit according to (31), wherein
the control circuitry performs control to stop the movement of at least one focus lens among the plurality of focus lenses in the case of the position of each of the focus lenses being outside the range.

(31) The lens unit according to (29) or (30), wherein
in the case of the position of each of the focus lenses being outside the range, the control circuitry controls the amount of movement of each of the plurality of focus lenses based on a type of the focus lens.

(32) The lens unit according to any one of (29) to (31), wherein
in the case of the position of each of the focus lenses being outside the range, the control circuitry controls the amount of movement of each of the plurality of focus lenses based on a type of the actuator corresponding to each of the plurality of focus lenses.

(33) The lens unit according to (29), wherein
in the case of the position of each of the focus lenses being outside the range, the control circuitry controls the amount of movement of each of the plurality of focus lenses based on an inter-group distance among the plurality of focus lenses.

(34) The lens unit according to any one of (27) to (33), wherein the control circuitry performs control to change a movement direction of at least one of the focus lenses based on a change of the position of each of the plurality of focus lenses from being inside the range to being outside the range.

(35) The lens unit according to any one of (27) to (34), wherein in the case of the position of each of the plurality of focus lenses being inside the range, an object distance based on the plurality of focus lenses is positioned between a minimum object distance and infinity.

(36) The lens unit according to any one of (27) to (35), wherein the designated range is between a minimum object distance and an infinity.

What is claimed is:

1. A lens unit comprising:
   a plurality of focus lenses arranged in sequence such that light passes through the plurality of focus lenses in the sequence;
   a plurality of actuators corresponding to the plurality of focus lenses and configured to move the plurality of focus lenses; and
   control circuitry configured to
      control the plurality of actuators to control movement of the plurality of focus lenses according to (i) a first rule in a first case of each of the plurality of focus lenses being positioned inside a designated range of the respective focus lens, and (ii) a second rule in a second case of a first focus lens of the plurality of focus lenses being positioned outside the designated range of the first focus lens, the first rule being based on a positional relationship between the plurality of focus lenses, and
      perform control to change a movement direction of at least one of the focus lenses based on a change of position of a second focus lens of the plurality of focus lenses from being inside the designated range of the second focus lens to being outside the designated range of the second focus lens.

2. The lens unit according to claim 1, wherein the designated range of each of the plurality of focus lenses corresponds to a range of optical performance of the respective focus lens according to a modulation transfer function.

3. The lens unit according to claim 1, wherein in the first case, an object distance based on the plurality of focus lenses is positioned between a minimum object distance and infinity.

4. The lens unit according to claim 1, wherein the second rule is based on the positional relationship between the plurality of focus lenses.

5. The lens unit according to claim 1, wherein when controlling the plurality of actuators according to the first rule, the control circuitry controls the actuators to maintain a characteristic related to spatial resolution.

6. The lens unit according to claim 1, wherein the designated range of each of the plurality of focus lenses is a subrange of a physical movement range of the respective focus lens.

7. The lens unit according to claim 1, wherein the control circuitry controls the movement of the plurality of focus lenses based on control information indicating an amount of blur per unit time.

8. The lens unit according to claim 7, wherein the control circuitry controls the movement of the plurality of focus lenses so that the amount of blur indicated by the control information is satisfied in the first case, and also satisfied in the second case.

9. The lens unit according to claim 1, wherein the control circuitry performs control so that an amount of movement per unit time of each of the plurality of focus lenses is different between the first case, and the second case.

10. The lens unit according to claim 9, wherein the control circuitry performs control to stop the movement of at least one focus lens among the plurality of focus lenses in the second case.

11. The lens unit according to claim 9, wherein in the second case, the control circuitry controls the amount of movement of each of the plurality of focus lenses based on a type of the respective focus lens.

12. The lens unit according to claim 9, wherein in the second case, the control circuitry controls the amount of movement of each of the plurality of focus lenses based on types of the actuator corresponding to the plurality of focus lenses.

13. The lens unit according to claim 9, wherein in the second case, the control circuitry controls the amount of movement of each of the plurality of focus lenses based on an inter-group distance among the plurality of focus lenses.

14. An imaging device comprising:
    a lens unit; and
    imaging circuitry,
    wherein the lens unit includes
       a plurality of focus lenses arranged in sequence such that light passes through the plurality of focus lenses in the sequence,
       a plurality of actuators corresponding to the plurality of focus lenses and configured to move the plurality of focus lenses, and
       control circuitry configured to
          control the plurality of actuators to control movement of the plurality of focus lenses according to (i) a first rule in a first case of each of the plurality of focus lenses being positioned inside a designated range of the respective focus lens, and (ii) a second rule in a second case of a first focus lens of the plurality of focus lenses being positioned outside the designated range of the first focus lens, the first rule being based on a positional relationship between the plurality of focus lenses, and
          perform control to change a movement direction of at least one of the focus lenses based on a change of position of a second focus lens of the plurality of focus lenses from being inside the designated range of the second focus lens to being outside the designated range of the second focus lens.

15. The imaging device according to claim 14, wherein the designated range of each of the plurality of focus lenses corresponds to a range of optical performance of the respective focus lens according to a modulation transfer function.

16. The imaging device according to claim 14, wherein in the first case, an object distance based on the plurality of focus lenses is positioned between a minimum object distance and infinity.

17. The imaging device according to claim 14, wherein the control circuitry performs control so that an amount of movement per unit time of each of the plurality of focus lenses is different between the first case, and the second case.

18. The imaging device according to claim 17, wherein the control circuitry performs control to stop the movement of at least one focus lens among the plurality of focus lenses in the second case.

19. The imaging device according to claim 14, wherein
the imaging circuitry includes blur amount control circuitry configured to control an amount of blur, and
the control circuitry of the lens unit is configured to control the movement of the plurality of focus lenses based on control information indicating an amount of blur per unit time acquired from the imaging circuitry.

20. The imaging device according to claim 19, wherein the blur amount control circuitry
determines the amount of blur per unit time based on a detection result of a signal obtained by imaging through the lens unit, and
causes control information indicating the determined amount of blur to be transmitted to the lens unit.

21. The imaging device according to claim 19, wherein the control circuitry controls the movement of the plurality of focus lenses so that the amount of blur indicated by the control information is satisfied in the first case, and also satisfied in the second case.

22. The imaging device according to claim 21, wherein in the second case, the control circuitry controls an amount of movement of each of the plurality of focus lenses based on an inter-group distance among the plurality of focus lenses.

23. A control method comprising:
controlling, via control circuitry and a plurality of actuators, movement of a plurality of focus lenses according to (i) a first rule in a first case of each of the plurality of focus lenses being positioned inside a designated range of the respective focus lens, and (ii) a second rule in a second case of a first focus lens of the plurality of focus lenses being positioned outside the designated range of the first focus lens, the first rule being based on a positional relationship between the plurality of focus lenses; and
performing control, via the control circuitry, to change a movement direction of a second focus lens of the plurality of focus lenses based on a change of position of the first focus lens from being inside the designated range of the second focus lens to being outside the designated range of the second focus lens, wherein
the plurality of focus lenses are arranged in sequence such that light passes through the plurality of focus lenses in the sequence.

24. The control method according to claim 23, wherein the designated range of each of the plurality of focus lenses corresponds to a range of optical performance of the respective focus lens according to a modulation transfer function.

25. The control method according to claim 23, wherein in the first case, an object distance based on the plurality of focus lenses is positioned between a minimum object distance and infinity.

26. The control method according to claim 23, further comprising:
performing control so that an amount of movement per unit time of each of the plurality of focus lenses is different between the first case, and the second case.

27. The control method according to claim 26, further comprising:
performing control to stop the movement of at least one focus lens among the plurality of focus lenses in the second case.

28. The control method according to claim 23, wherein the control circuitry controls the movement of the plurality of focus lenses based on control information indicating an amount of blur per unit time.

29. The control method according to claim 28, further comprising:
controlling the movement of the plurality of focus lenses so that an amount of blur indicated by the control information is satisfied in the first case, and also satisfied in the second case.

30. The control method according to claim 29, further comprising:
controlling, in the first case, the amount of movement of each of the plurality of focus lenses based on an inter-group distance among the plurality of focus lenses.

31. A lens unit comprising:
a plurality of focus lenses arranged in sequence such that light passes through the plurality of focus lenses in the sequence;
a plurality of actuators corresponding to the plurality of focus lenses and configured to move the plurality of focus lenses; and
control circuitry configured to
control the plurality of actuators to control movement of the plurality of focus lenses according to a first rule in a first case of a first focus lens of the plurality of focus lenses being within an exterior range outside a designated range of the first focus lens, the first rule being different from a second rule in a second case of each of the plurality of focus lenses being positioned inside a designated range of the respective focus lens, and
perform control to change a movement direction of a second focus lens of the focus lenses based on a change of position of the second focus lenses from being inside the designated range of the second focus lens to being outside the designated range of the second focus lens,
wherein the designated range of the first focus lens is a subset of the exterior range which represents a full range of physical movement of the first focus lens.

* * * * *